United States Patent
Wabnegger et al.

(10) Patent No.: US 12,092,445 B2
(45) Date of Patent: *Sep. 17, 2024

(54) IMPLOSION SHIELD APPARATUS AND METHOD

(71) Applicant: Quanta Associates, L.P., Houston, TX (US)

(72) Inventors: David Karl Wabnegger, Burnaby (CA); Daniel Neil O'Connell, Burnaby (CA); Mark Douglas Ferrari, Houston, TX (US); Benjamin James Harvey, Burnaby (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,458

(22) Filed: Jun. 8, 2023

(65) Prior Publication Data

US 2023/0314113 A1 Oct. 5, 2023

Related U.S. Application Data

(63) Continuation of application No. 17/127,511, filed on Dec. 18, 2020, now Pat. No. 11,713,954.
(Continued)

(30) Foreign Application Priority Data

Dec. 20, 2019 (CA) .............................. CA 3065707

(51) Int. Cl.
*F42D 5/05* (2006.01)
*D03D 1/00* (2006.01)
(Continued)

(52) U.S. Cl.
CPC .............. *F42D 5/05* (2013.01); *D03D 1/0052* (2013.01); *D04B 21/18* (2013.01); *H02G 1/02* (2013.01);
(Continued)

(58) Field of Classification Search
CPC .......... F41H 5/0485; F42D 5/045; F42D 5/05; F42D 5/055
(Continued)

(56) References Cited

U.S. PATENT DOCUMENTS 3,491,847 A * 1/1970 Abbott ................... B65D 85/68
102/303
3,648,613 A * 3/1972 Cunn ........................ F42D 5/05
102/303
(Continued)

FOREIGN PATENT DOCUMENTS

| CA | 2307796 A1 | 11/2001 |
|---|---|---|
| CN | 211530711 U | 9/2020 |
| CO | 93-415969 | 6/1992 |

OTHER PUBLICATIONS

Hamidi, Evelyn, CPA Global Search Results an Implosion Device Used on a Powerline, Dec. 7, 2020, 8 pages, CPA Global, North America.
(Continued)

*Primary Examiner* — Bret Hayes
(74) *Attorney, Agent, or Firm* — Mark A. Oathout; Antony C. Edwards; Laura Tu

(57) ABSTRACT

An implosion shield of ballistic fabric adapted to mount so as to surround an implosion sleeve or dead-end on a power line. The implosion shield may be wrapped or formed as an envelope or tent including one piece and folded around the implosion sleeve or dead-end and secured with fasteners. A method of installing the implosion cover may include
(Continued)

installing an implosion sleeve or dead-end on a power line, and then installing the implosion shield around the implosion sleeve or dead-end, by wrapping the implosion shield around the implosion sleeve or dead-end, or by securing an envelope implosion shield over the implosion sleeve or dead-end, or by draping the shield over the implosion sleeve or dead-end, or by mounting the shield on a frame over the implosion sleeve or dead-end, then detonating the implosion sleeve or dead-end. The implosion shield attenuates shock, pressure and sound waves from the detonation.

19 Claims, 20 Drawing Sheets

Related U.S. Application Data

(60) Provisional application No. 62/951,874, filed on Dec. 20, 2019.

(51) Int. Cl.
  D04B 21/18 (2006.01)
  H02G 1/02 (2006.01)
  H02G 1/14 (2006.01)

(52) U.S. Cl.
  CPC ......... H02G 1/14 (2013.01); *D10B 2401/061* (2013.01); *D10B 2505/00* (2013.01)

(58) Field of Classification Search
  USPC ............... 102/303, 305; 86/50; 89/916, 922
  See application file for complete search history.

(56) References Cited

U.S. PATENT DOCUMENTS

| | | | | |
|---|---|---|---|---|
| 4,057,359 A * | 11/1977 | Grooman | ............... | F01D 21/045 |
| | | | | 428/36.1 |
| 4,283,597 A | 8/1981 | Cooper, Jr. | | |
| 5,153,383 A * | 10/1992 | Whited | ................. | H01B 17/00 |
| | | | | 174/138 F |
| 5,299,951 A | 4/1994 | Blaetz | | |
| 6,439,120 B1 * | 8/2002 | Bureaux | ................. | F42D 5/045 |
| | | | | 102/303 |
| 6,664,473 B2 | 12/2003 | Christman et al. | | |
| 6,982,611 B2 | 1/2006 | Cope | | |
| 7,674,121 B2 | 3/2010 | Khemakhem | | |
| 7,872,197 B2 | 1/2011 | Vallauri et al. | | |
| 8,653,366 B2 | 2/2014 | Quesnel | | |
| 11,713,954 B2 * | 8/2023 | Wabnegger | .............. | H02G 1/02 |
| | | | | 102/303 |
| 2001/0049245 A1 * | 12/2001 | Soar | ..................... | D03D 15/283 |
| | | | | 428/911 |
| 2006/0035508 A1 | 2/2006 | Stekelenburg | | |
| 2007/0210011 A1 * | 9/2007 | Hook | .................... | B01D 39/08 |
| | | | | 264/321 |
| 2008/0233787 A1 * | 9/2008 | Geibel | ..................... | H01R 4/08 |
| | | | | 439/312 |
| 2012/0214335 A1 | 8/2012 | Natoli et al. | | |
| 2013/0098233 A1 * | 4/2013 | Peters | ....................... | F41H 5/08 |
| | | | | 89/36.02 |
| 2015/0303675 A1 * | 10/2015 | Schwarz | .............. | H02G 15/013 |
| | | | | 29/863 |
| 2016/0040962 A1 * | 2/2016 | Rossow | ................... | B32B 5/06 |
| | | | | 89/36.02 |

OTHER PUBLICATIONS

Manitoba Hydro, Using Implosion Sleeves to Splice Conductor <available at https://www.youtube.com/watch?v=KuMkQxdn7OA and last accessed on Apr. 24, 2024>, Jul. 11, 2012, 3 pages, Youtube.com.

Jorge, Javier, Office Action for Canadian Patent Application No. 3,065,707, Mar. 1, 2024, 5 pages, Canadian Intellectual Property Office, Canada.

Jorge, Javier, Office Action for Canadian Patent Application No. 3,160,790, Feb. 14, 2024, 5 pages, Canadian Intellectual Property Office, Canada.

Cofre, Jose Anibal Dinamarca, Expert's Response on Application for Patent of Invention for Chilean Patent Application No. 202201696, Oct. 18, 2023, 19 pages, National Institute of Industrial Property, Chile.

Cofre, Jose Anibal Dinamarca, Expert Opinion on a Patent Application for Chilean Patent Application No. 202201696, Mar. 4, 2024, 17 pages, National Institute of Industrial Property, Chile.

Orozco, Edna Marcela Ramirez, Office Action No. 1584, Jan. 30, 2024, 9 pages, Republic of Colombia Superintendence of Industry and Commerce, Colombia.

\* cited by examiner

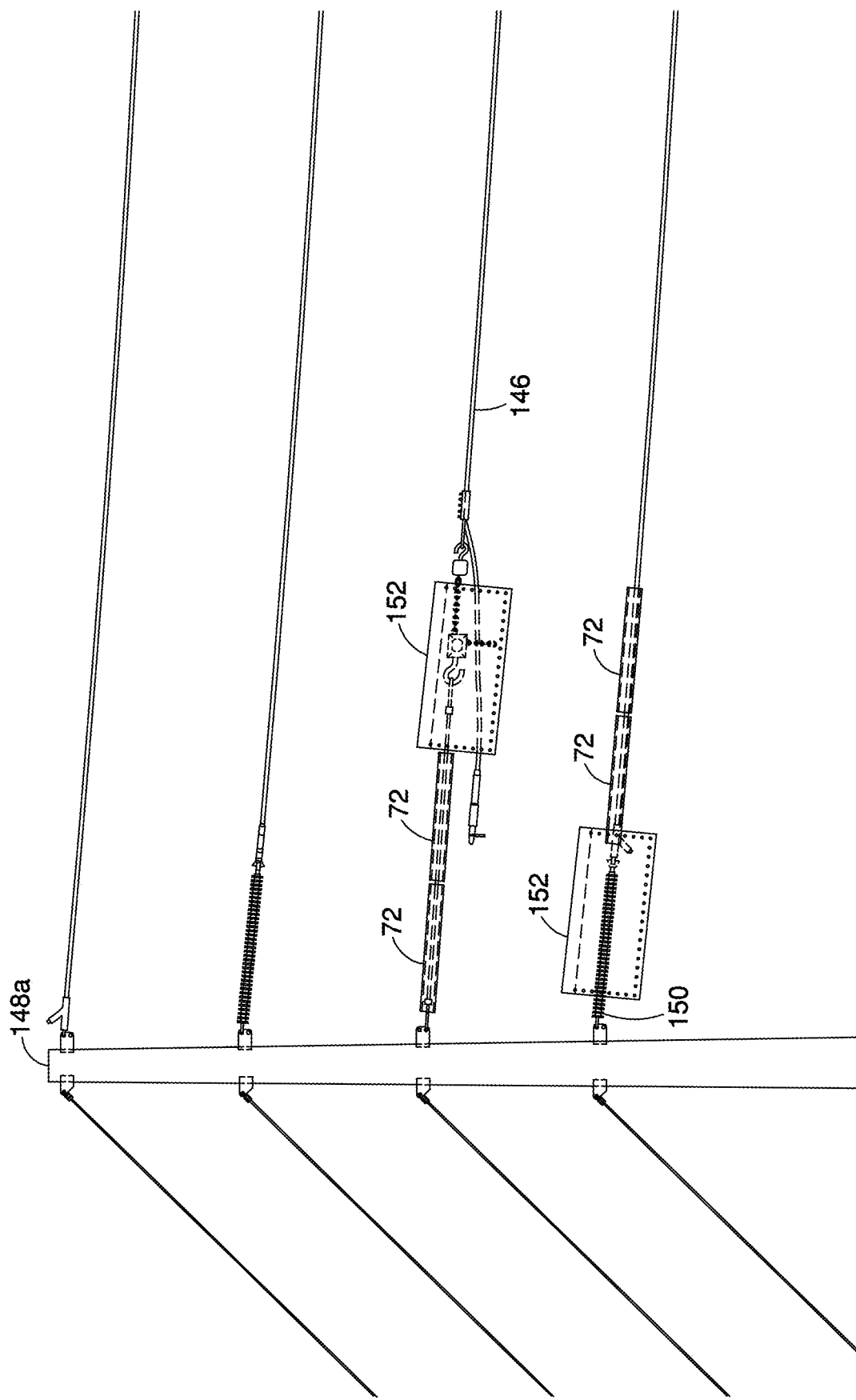

IMPLOSION SHIELD APPARATUS AND METHOD

TECHNICAL FIELD

This disclosure relates to an apparatus for shielding an implosion device used on a power line, a method of installing an apparatus for shielding an implosion device on a power line, and a method and apparatus for protecting adjacent apparatus such as insulators, tools, hoists, grips and slings and for protecting fragile items such as windows at a distance.

BACKGROUND

In the process of electrically joining two free ends of separate electrical power line conductors to create a single, continuous electrically conductive joint, a mechanical connection is typically used to join the two free ends and maintain electrical and mechanical integrity and requisite ampacity in the conductor. To achieve the requisite mechanical connection and to provide an electrically sufficient electrical connection, an implosion device may be used to form the joint and mechanical connection with the two free ends of the separate conductors. While implosion devices have typically been adequate in achieving the desired mechanical connection properties to safely join the two free ends of two conductors, while achieving the desired electrical connection of the two free ends, such implosion devices are not without limitations, and room for improvement exists. Also, to mechanically terminate a powerline conductor an implosion device may also be used. What is desired is an apparatus and method of using an apparatus to reduce audible implosion noise, to attenuate or otherwise reduce the amplitude of shock and pressure waves emanating externally from detonation of the explosive used for the implosion, to contain or slow blast fragmentation debris while maintaining the desired mechanical and electrical connection of two free ends of two separate electrical conductors, and to protect adjacent tools, equipment, apparatus, hardware, structures or connected equipment.

One of the problems addressed in the present disclosure is how to minimize the external effects of the implosion detonation during the implosion splicing or terminating procedure. As described better below, the implosion splicing device, such as supplied for example by Burndy of Manchester, New Hampshire, USA under the trademark IMPLO, is an explosive device using a wrapping of detonation cord around a hollow aluminum tube which, in use, is installed so as to contain the ends of the two conductors to be joined. The implosion of the detonation cord wrapped around the aluminum tube fuses the aluminum tube with the ends of the conductors making a seamless splice having better mechanical and electrical properties than a mechanical or compression splice. The implosion splice device is a one-time use, being disposed of after the implosion detonation. Applicant's postulate however that one or more embodiments of the flexible implosion shielding device described below, which is intended to attenuate externally propagating pressure, shock, and sound waves, and fragmentation resulting from the detonation will withstand the external effects of an implosion sufficiently that the device will withstand more than one implosion detonation when used temporarily when the conductors are implosion spliced or terminated while in an energized or non-energized state. Thus, the implosion shielding device described herein is not permanently installed on a power line conductor, but rather is only used to splice or terminate power line conductor ends together during construction, or in addition to shield adjacent structure, equipment or rigging from effects of the blast.

In the prior art, applicant is aware of published US patent application, publication number 20120129416, which published on May 24, 2012 in the application of Auxetic Technologies Ltd. for Auxetic Knitted Fabric, the relevancy of which is discussed below in relation to the present application. The Auxetic Knitted Fabric published patent application, incorporated herein by reference, discloses an auxetic knitted fabric comprising an auxetic component knitted from at least a first type of fibre, and a stabilizing component knitted from at least a second type of fibre, wherein the first and second fibre types have different mechanical properties.

BRIEF SUMMARY OF THE DISCLOSURE

The disclosure may include an implosion device such as an implosion sleeve or implosion dead-end sleeve and a protective implosion shield surrounding or shrouding the implosion device so as to attenuate an external shock wave, sound wave and fragmentation resulting from the detonation of the device or a protective implosion shield surrounding, shrouding or covering adjacent tools, equipment, apparatus, hardware, structures or connected equipment. In order to accomplish this, various embodiments are described below, such as an implosion protective shield that at least partially, and in some embodiments fully surrounds the implosion sleeve, or an implosion protective shield that is mounted on a frame that supports the implosion cover spaced apart from and over the implosion or an implosion protective shield that at least partially, and in some embodiments fully surrounds and protects adjacent tools, equipment, apparatus, hardware, structures or connected equipment, or an implosion protective shield that is mounted on a frame that supports the implosion cover.

The frame may for example suspend itself from the conductors to be joined or terminated. This may be a stable arrangement where the frame is at least partially above and partially below or around the conductors and implosion device. In order to suspend the frame, at least a part of the frame, for example a spaced apart pair of support arms supporting the frame, may be mounted on the conductors, so as to extend approximately perpendicular to the implosion device. The implosion protective shield is intended provide a blast, shock wave and sound attenuating protective barrier. Advantageously the shield incorporates, in whole or in part, auxetic ballistic fabric for improved ballistic resistance and improved detonation shock and sound wave attenuation. Additionally, the use of auxetic ballistic fabric may provide at least some attenuation of electro-magnetic energy which may radiate from the detonation of the implosion splice so as to reduce effects of the electro-magnetic energy on electronics within an effected distance of the radiation.

The disclosure also includes a method of, once an implosion splicing device is installed on a power line (e.g., two separate loose ends of different abutting conductors or terminating a conductor end to hold tension), installing an implosion protective shield on or around the implosion device.

Various embodiments such as rolled, enveloped and tented implosion shields are described below and illustrated in the accompanying drawing figures.

In further embodiments, implosion protective shields may also be mounted on, so as to protect, adjacent tools, equipment, apparatus, hardware, structures or connected equipment which would be in proximity to the implosion splicing or terminating.

BRIEF DESCRIPTION OF THE DRAWINGS

A more complete understanding of the present disclosure and benefits thereof may be acquired by referring to the follow description taken in conjunction with the accompanying drawings wherein like reference numerals depict corresponding parts in each view, in which:

FIG. 15A is a side elevation view of the dead-end of FIG. 15 showing the protected rigging, hardware and insulators in better detail;

DETAILED DESCRIPTION

Turning now to a detailed description of the present teachings with reference to the accompanying Figures, features and concepts also may be manifested in other arrangements and so the scope of the teachings is not limited to the embodiments described or depicted in the Figures. The following examples of certain embodiments of the teachings are provided. Each example is provided by way of explanation of the teachings, one of many examples of the teachings, and the following examples should not be read to limit, or define, the scope of the teachings.

Figure 1:
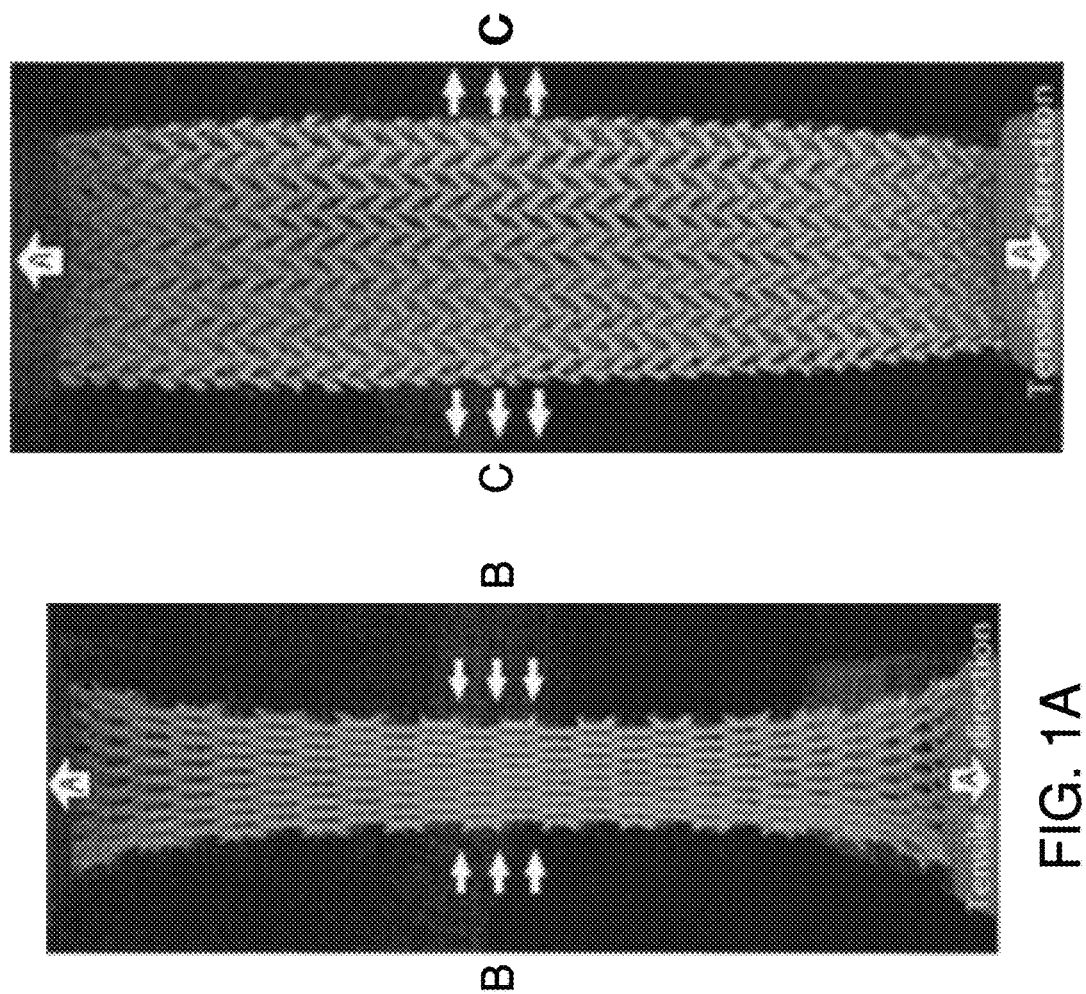
FIG. 1A illustrates the laterally constricting effect of a longitudinal tensile force acting on a length of conventional (positive Poisson's ratio) knitted fabric.
FIG. 1B illustrates the laterally expanding effect of a longitudinal tensile force acting on a length of auxetic (negative Poisson's ratio) knitted fabric.

FIG. 1A illustrates, as is known in the prior art, the laterally constricting effect of a longitudinal tensile force acting on a length of conventional (positive Poisson's ratio) knitted fabric. FIG. 1B illustrates, as is also known in the prior art, the laterally expanding effect of a longitudinal tensile force acting on a length of auxetic (negative Poisson's ratio) knitted fabric. The usefulness of the laterally expanding effect of auxetic materials when put in longitudinal tension is discussed below in relation to embodiments of implosion sleeves according to this disclosure.

Figure 2:
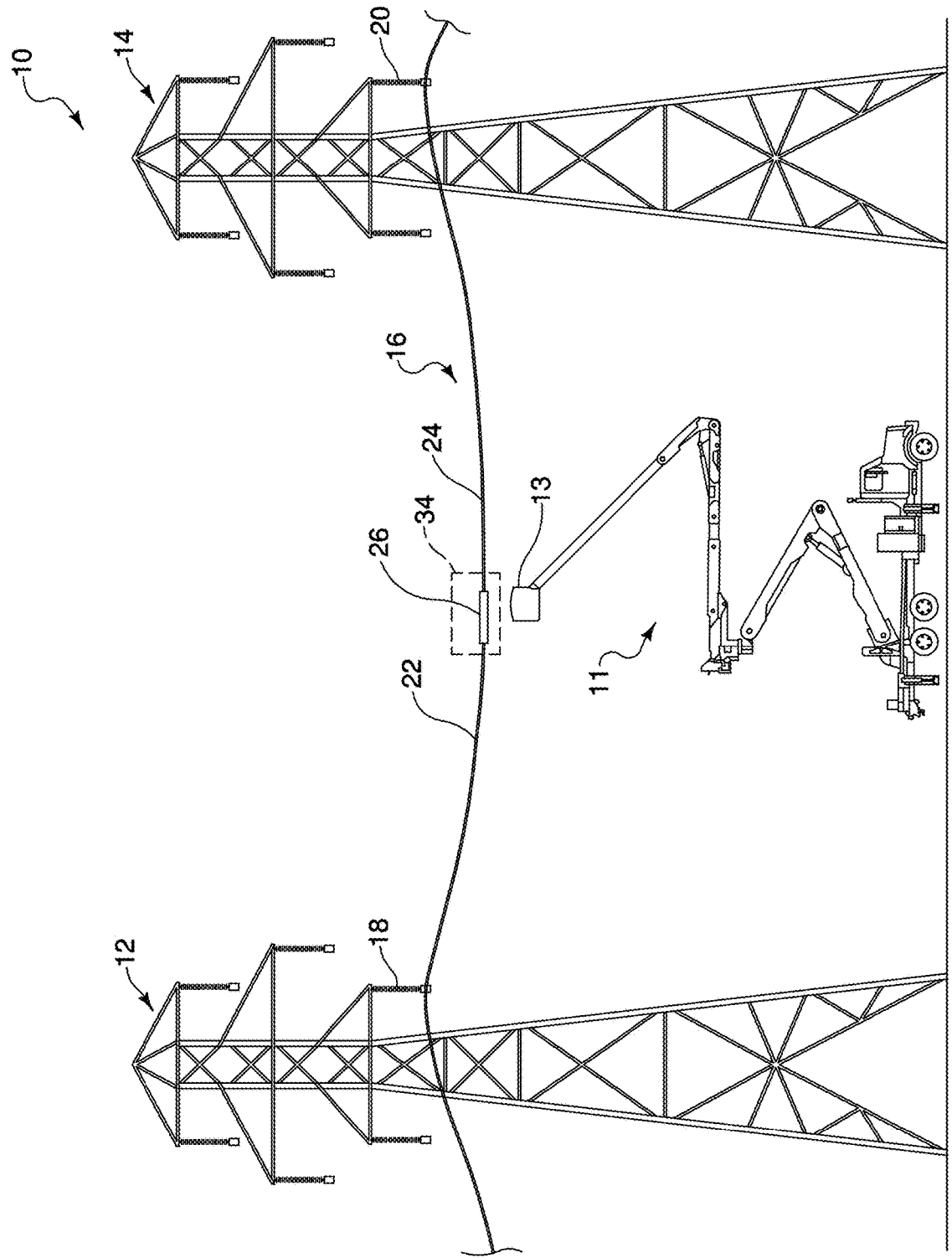
FIG. 2 is a perspective view of a power line supported between two support structures, with an implosion shield (shown in dotted outline) mounted over and around an implosion sleeve installed ready for an implosion splice to the two ends of the conductors held within the implosion sleeve, in accordance with the present disclosure.

FIG. 2 depicts an example of an outdoor electrical power line 10 with an electrical conductor 16 attached to electrical power line structures 12 and 14. Electrical conductor 16 is attached to power line structure 12 using an insulator or insulators 18, and to power line structure 14 using an insulator or insulators 20. Due to extreme lengths of electrical conductors used in delivering electricity, electrical conductor 16 may be separate pieces joined together to form electrical conductor 16. As an example, electrical conductor 16 may be an electrical conductor 22 and electrical conductor 24 joined together by an implosion sleeve 26. Implosion sleeve 26 may be used to join conductor 22 and conductor 24 when a lineman or person residing within bucket 13 of bucket truck 11 installs implosion sleeve 26 into place over each loose end of conductor 22 and conductor 24. FIG. 2 also depicts an implosion shield 34 in place over and around implosion sleeve 26, in accordance with teachings of the present disclosure. Implosion shield 34 may be manufactured from an explosion or blast reduction type of material, as will be explained herein.

Figure 2A:
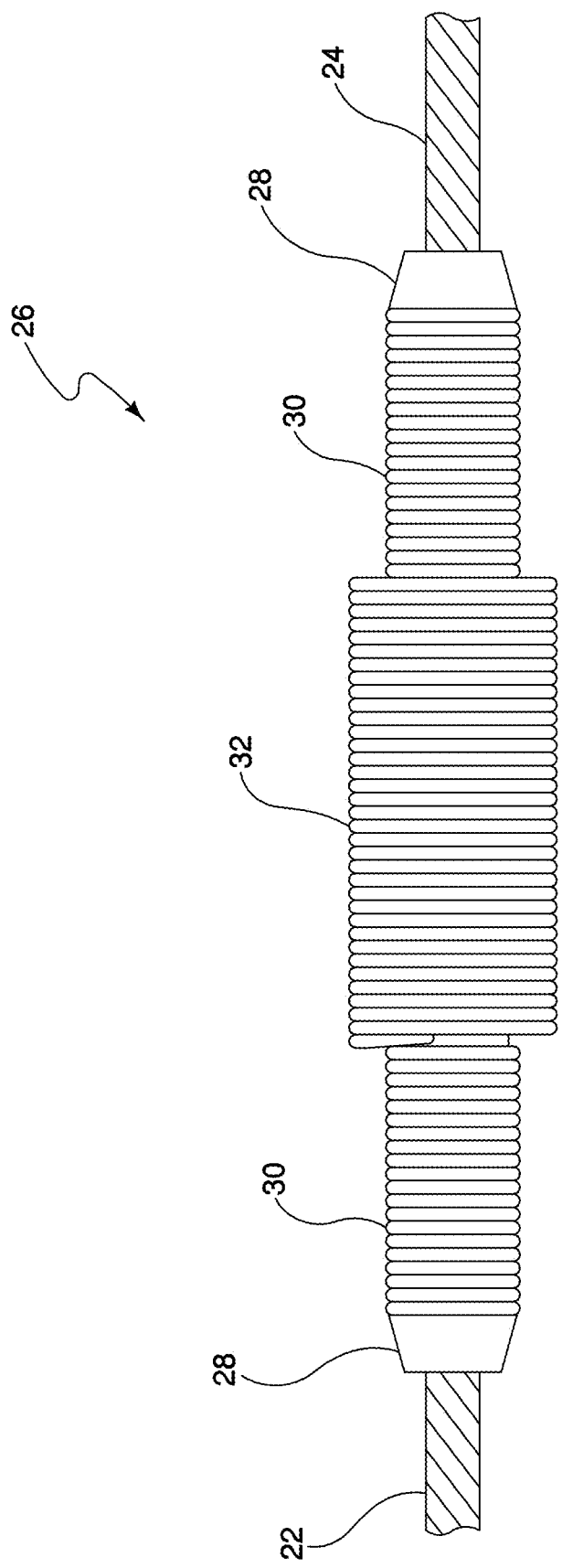
FIG. 2A is an enlarged view of the implosion sleeve of FIG. 2, showing a side view of the implosion sleeve in accordance with the present disclosure.

FIG. 2A depicts a larger view of implosion sleeve 26 whose subcomponents may be an aluminum tube 28 that is surrounded or wrapped by an explosive product 30. Explosive wrap product 30 advantageously may be detonation cord that is tightly wrapped around aluminum tube 28, for approximately the entire length of aluminum tube 28. An additional layer of explosive wrap product 32 (advantageously also detonation cord) may be wrapped around layer of explosive product 30, preferably centralized along tube 28 as depicted in FIG. 2A to ensure an effective implosion to join electrical conductor 22, electrical conductor 24 and implosion sleeve 26 to form a properly welded, melted, fused and compressed joint between the adjacent, opposed facing ends of electrical conductor 22 and electrical conductor 24, and aluminum tube 28 of implosion sleeve 26. Alternatively, explosive wrap product 32 may additionally act as a protective wrap to keep explosive product 30 in place in the central position of implosion sleeve 26.

Figure 3:
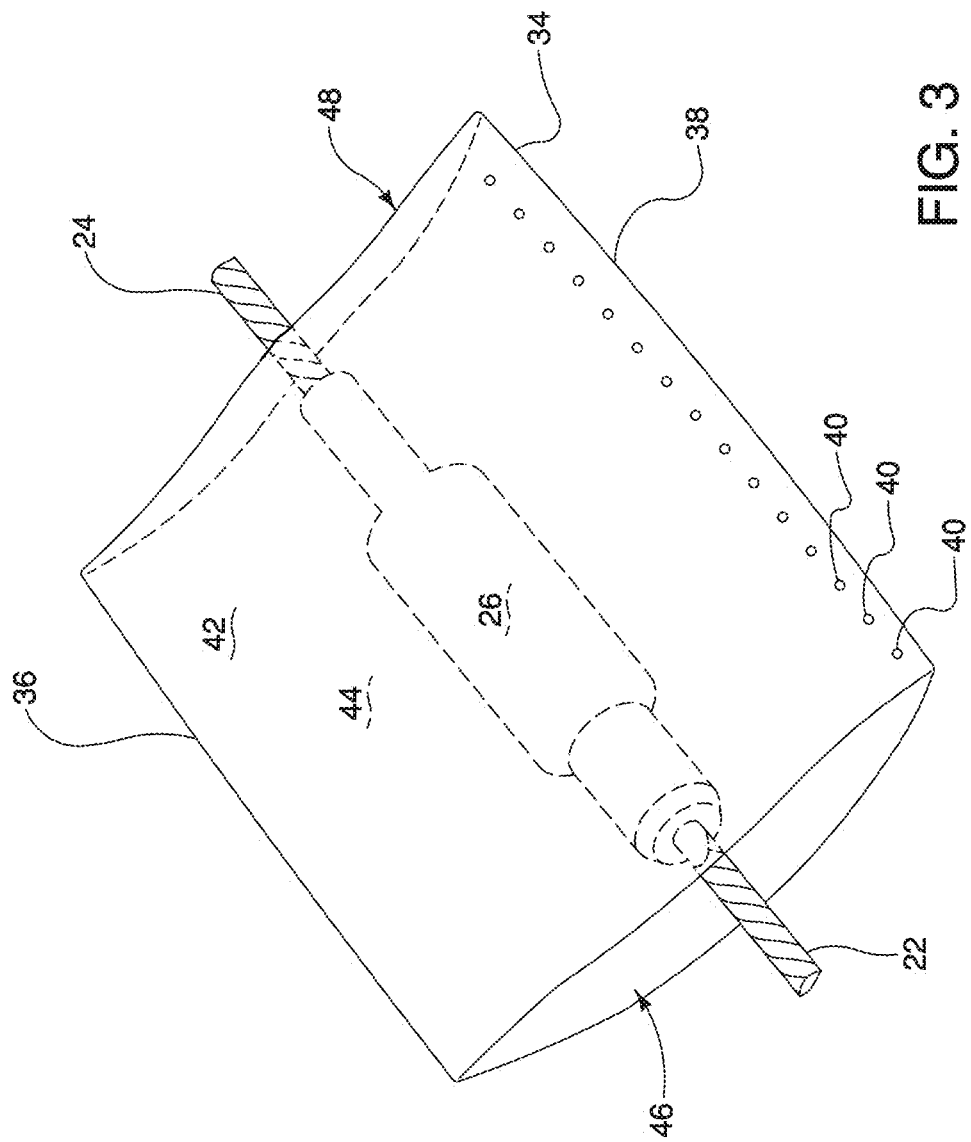
FIG. 3 is a perspective view of an implosion shield enveloping an implosion sleeve in accordance with the present disclosure.

FIG. 3 depicts implosion sleeve 26 within an implosion shield 34. Implosion shield 34 may preferably be made of a ballistic fabric. Ballistic fabric is a fabric that is capable of absorbing and deflecting the heated and pressurized gases emanating at high velocity from a detonation form of explosion, and capturing or slowing the escape of fragmentation from the explosion, depending upon its arrangement relative to an explosion. Energy of a high velocity projectile impacting the ballistic fabric is absorbed by the ballistic fabric. To be effective, ballistic fabric is woven of yarn that stretches at relatively low strain rates before reaching its yield stress. An explosion causes a longitudinal stress to be transmitted through a yarn pair, which allows the whole or entire yarn in a ballistic fabric to absorb the loading caused by an explosion. In other words, stress and strain loading at one location in the fabric is absorbed by a delocalized portion of, or at least more of the fabric structure than the local impact point. Relative to other fabrics, ballistic fabric absorbs greater energy as work is performed on more of the fabric than just the localized fabric surrounding the impact zone.

Advantageously, the ballistic fabric of the present disclosure and teachings may be an auxetic structure or material. An auxetic structure or material is one that has a negative Poisson's ratio, which means that it is a structure or material that increases in dimension (e.g., becomes wider or thicker) when a tensile force is applied perpendicular to that increase in dimension. The internal structure of the material is designed or exists in such a way that deformation increases perpendicular to a uniaxial load. An example of auxetic knitted fabric having these auxetic characteristics is described in published US patent application no. 20120129416, entitled Auxetic Knitted Fabric. As would thus be known to one skilled in the art, auxetic knitted fabric expands or widens in a direction perpendicular to tension pulling on the yarn in knitted fabric. An example, for the sake of illustrating a comparison of the behaviour of conventional knitted fabric versus auxetic knitted fabric, is illustrated in FIGS. 1A and 1B. In FIG. 1A, a tensile force in direction A pulls the yarn in conventional, positive Poisson's ratio, knitted fabric longitudinally. The result of the pulling in direction A is a lateral constriction of the fabric in direction B, tending to close the spacing or holes between the yarn fibres. In FIG. 1B on the other hand, the same tensile force in direction A pulling the yarn longitudinally in auxetic, negative Poisson's ratio, knitted fabric results in a lateral widening of the fabric in direction C. This widening tends to open the spacing or holes between the yarn fibres.

The characteristics of auxetic knitted fabric may be advantageous in use as an explosive shield because, if an axial tensile load caused by an explosion is along the longitudinal axes of parallel yarn fibres making up the auxetic knitted fabric, then the expansion of the auxetic knitted fabric perpendicular to the longitudinal axes of the yarn may be designed to open apertures between adjacent yarn fibres for so long as the axial load is maintained on the yarn. The opening of apertures between adjacent yarn fibres across the width of the fabric is useful for explosion attenuation as it allows some of the pressurized heated gases produced by the detonation explosion to escape through the widened apertures. This expansion of the auxetic fabric may assist in reducing the need to otherwise channel or dissipate those gases to reduce the explosive gas pressure. Preferably the auxetic knitted fabric is resilient so that, once the tensile axial loading on the yarn dissipates, the expansion of the fabric perpendicular to the long axes of the yarn will cease and the fabric may then return to its undeformed dimensions, thereby closing the apertures between the yarn until the next loading event. The implosion shield may thus be reusable.

As described at meridian.us by Meridian Global Consulting, located in Mobile, Alabama, USA, who are a supplier of auxetic ballistic fabric, a ballistic fabric may be constructed of parallel yarns, where each yarn has its own independent wrap of fibres weaved, for example helically wound, around the yarn. For example, the wrap fibres may be aramid fibres or the like such as sold under the trademark Spectra™. When a high velocity projectile from an explosion strikes the auxetic ballistic fabric, the yarns are loaded by stretching and absorb the resulting stress in the yarns. The wrap fibres woven around the yarn under strain also absorb some of the strain energy, as the yarn is in tension and expands or grows into the wrap fibres. Strain energy transferred into the wrap fibre weaves is enhanced, and thus strain energy transferred into the entirety of a piece of auxetic ballistic fibre is enhanced. The Meridian auxetic ballistic fabric may be used in accordance with the present teachings, to provide the implosion shields depicted and discussed in accordance with the present teachings.

Figure 5:
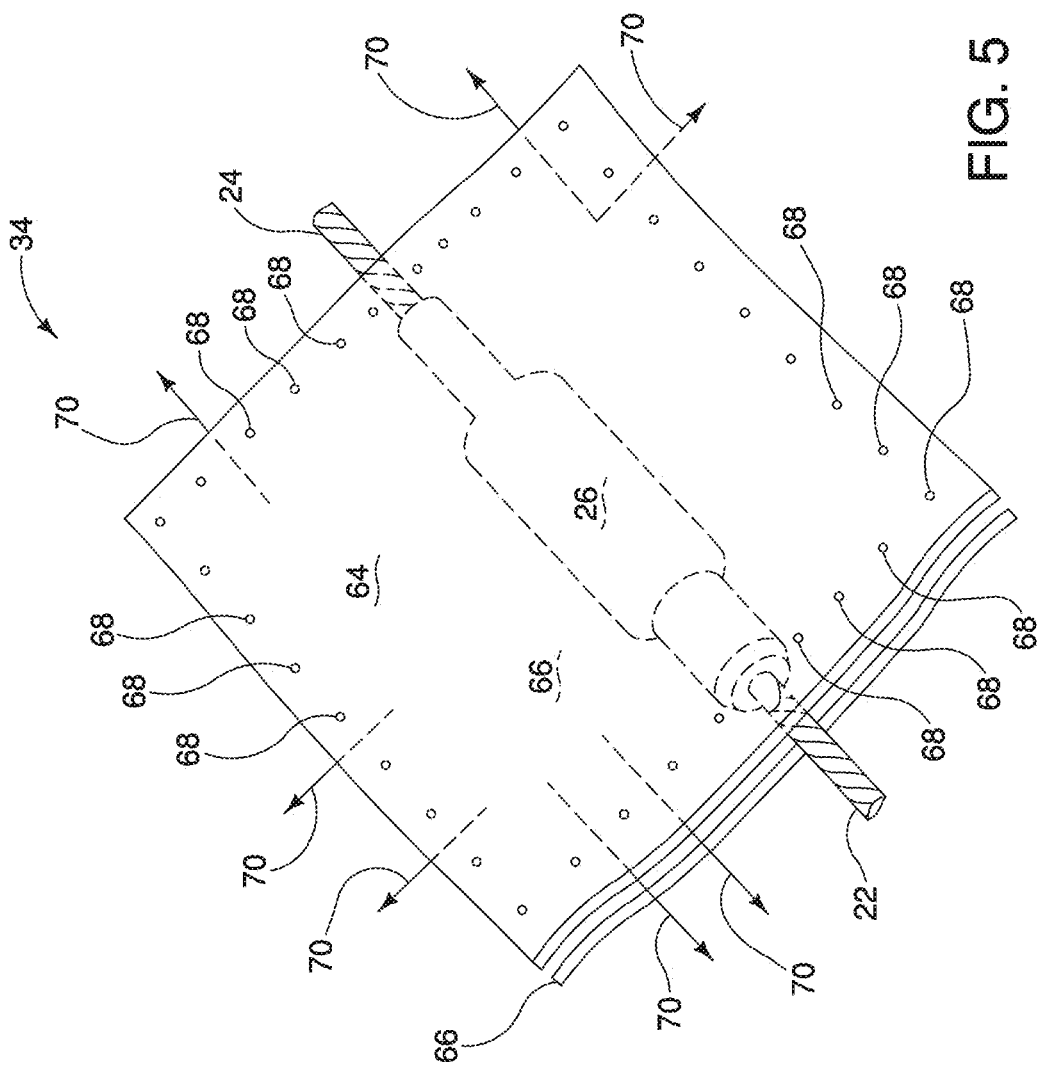
FIG. 5 is a perspective view of an implosion shield surrounding an implosion sleeve in accordance with the present disclosure.

Continuing with FIG. 3, in one embodiment, implosion shield 34 may be made from a single, for example rectangular piece (or layered sandwich of pieces, which may be quilted, such as seen in FIG. 5) of ballistic fabric that is folded once around implosion sleeve 26. Preferably the ballistic fabric is auxetic ballistic fabric. Thus, edge or fold 36 is where the ballistic fabric of implosion shield 34 would double-back or fold-over on itself. Edge 38 is then the mating location where the loose ends, distal from fold 36, of the ballistic fabric of implosion shield 34 may be fastened to one another. Thus, a fastener 40, or series of fasteners 40, may be used fasten edge 38 closed or loosely closed to thereby secure implosion cover 34 over implosion sleeve 26. In this folded, envelope embodiment depicted in FIG. 3, implosion shield 34 may then be described as an envelope having a first side 42 and a second side 44 mounted on opposite sides of implosion sleeve 26.

Fastener 40 may advantageously be made of resilient and flexible material, for example so as to fasten by means of stitching to reduce the risk of hard fragmentation should the fasteners 40 deform, break or disintegrate upon detonation of the implosion sleeve 26. If implosion shield 34 is designed to avoid fragmentation of fasteners 40, for example if the dimensions of shield 34 are large enough, then fasteners 40 may alternatively be rigid fasteners, for example including rivets, staples, threaded fasteners such as nuts and bolts, carabiners or other clips, or other rigid fasteners to secure together edge 38 of implosion shield 34. While edge 36 and edge 38 are closed edges, adjacent sides of the envelope of implosion shield 34 are open as exhibited by opposite openings 46 and 48. The envelope is hollow, and the area and volume within the envelope between opening 46 and opening 48 sufficiently voluminous to provide a gas pass-through or open directional conduit to permit the exit from implosion shield 34 of explosion gases from the detonation of implosion sleeve 26, as will be explained in better detail below.

Figure 4:
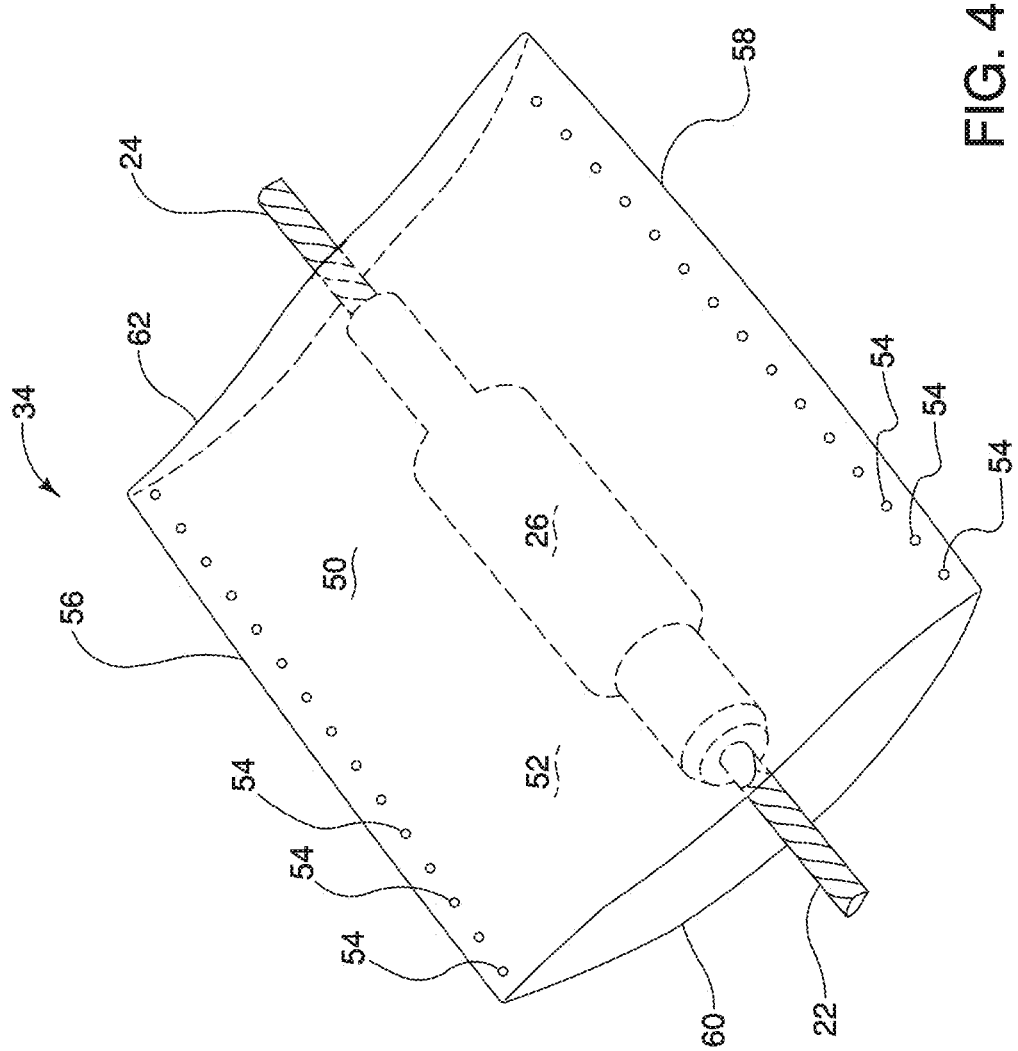
FIG. 4 is a perspective view of an implosion shield enveloping an implosion sleeve in accordance with the present disclosure.

FIG. 4 depicts an embodiment similar to the envelope embodiment of FIG. 3. In FIG. 4, instead of a single piece or single layered sandwich of ballistic fabric having a fold at edge 36, FIG. 4 depicts two pieces of ballistic fabric, or two pieces of layered ballistic sandwich, joined or fastened together to form an envelope shaped shield 34. First ballistic side panel 50 and second ballistic side panel 52 are located on opposite sides of implosion sleeve 26. Panels 50 and 52 are joined to one another to form an open ended envelope using fasteners 54 along opposite edges 56 and edge 58. Fasteners 54 may be the same as the fasteners 40 used in the embodiment of FIG. 3. Similar to the open ended envelope of FIG. 3, edges or sides adjacent to, and extending between, edge 56 and edge 58 may be fully or partially open to permit the free flow of escaping high pressure gases caused by the detonation of implosion sleeve 26. As with the embodiment of FIG. 3, shock waves and accompanying sound waves due to the detonation of implosion sleeve 26, which although may partially escape attenuation to the extent that the shock and sound waves escape through open ends 60 and 62, will for the most part impact ballistic side panels 50 and 52 so as to be attenuated by the ballistic fabric in the panels as the shock and sound waves pass through the panels. Gas flow may also partially escape between the fastened edges 56, 58 assuming only a somewhat loose fastening of those edges by fasteners 54. Simultaneous with the gas expansion, and radiation of the shock and sound waves from the detonation, any fragmentation will mostly be contained by ballistic side panels 50, 52 and along edges 56, 58.

As referred to above, FIG. 5 depicts another envelope embodiment, although in this embodiment closed or fastened together circumferentially all around its edges, in which two or more separate pieces of ballistic fabric (two are depicted for sake of clarity in the drawings), each acting as one half of implosion shield 34 are mounted to each other to form a closed envelope adapted to be mounted over an implosion sleeve 26. In particular, ballistic panels 64 and 66 are located on opposite sides of implosion sleeve 26 and fastened to one another by fasteners 68 so as to securely place ballistic panels 64 and 66 around, to completely envelope, implosion sleeve 26. Fasteners 68 may be the same as fasteners 40 or fasteners 54, except that fasteners 68 will advantageously not seal the edges so as to leave gas escape pathways 70 through the fasteners around some or all of the entire circumferential edge or periphery of the implosion shield 34 formed from ballistic panels 64 and 66.

When implosion sleeve 26 is detonated, ballistic panels 64 and 66 prevent the escape of some or all of any fragmentation debris, and also lessen or attenuate the detonation sound waves, pressure waves and shock waves caused by detonation of implosion sleeve 26. By lessening or attenuation of the pressure waves, it is meant that the measured air pressure on the exterior sides of ballistic panels 64 and 66 (external in the sense of being opposite to the sides adjacent to implosion sleeve 26), will be less than the air pressure if measured on the interior of ballistic panels 64 and 66; that is, adjacent to implosion sleeve 26 during and immediately after detonation of implosion sleeve 26.

Regardless of the configuration of an implosion shield according to the present teachings, for example those in the various depicted embodiments, when an implosion shield according to this description is positioned and oriented according to this description between a bystander and a detonating implosion sleeve 26, the sound wave, pressure wave, and shock wave, experienced by the bystander as a consequence of the detonation are all reduced in amplitude and impact on the bystander as compared to if the implosion shield were not used.

Figure 6:
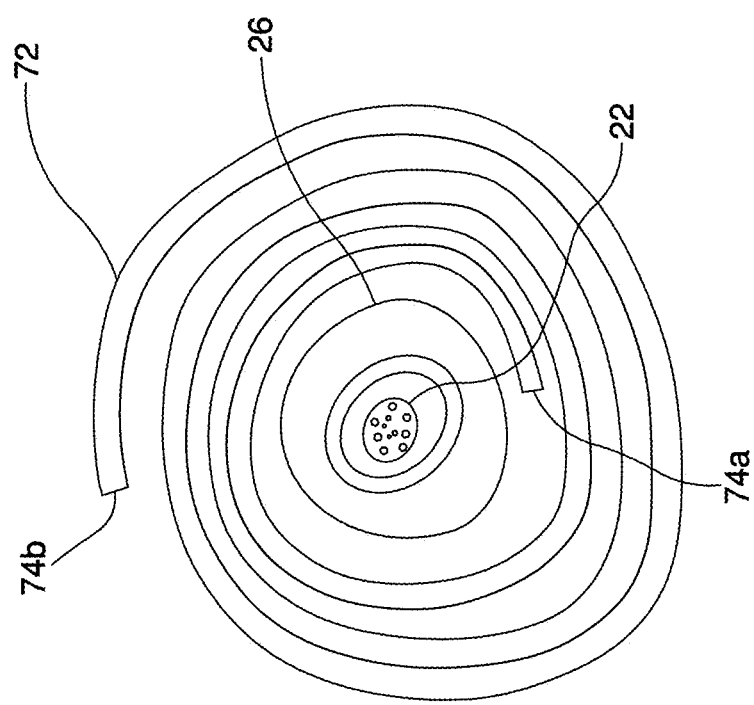
FIG. 6 is an end view of an implosion shield rolled or wrapped around an implosion sleeve in accordance with the present disclosure.

FIG. 6 depicts another embodiment of the disclosure in which a single sheet or sandwiched piece of ballistic fabric, which may for example be rectangular, can be secured, fixed or otherwise mounted around implosion sleeve 26 by wrapping or rolling ballistic fabric about an implosion sleeve 26 to form an approximately cylindrical wrapped implosion shield 72. FIG. 6 is an end view (viewed in section through and along a power line 22) of implosion sleeve 26 mounted on the conductor ready for the implosion splicing, depicting wrapped implosion shield 72 in its wrapped-around or rolled installation position around implosion sleeve 26. Wrapped implosion shield 72 provides at least one advantage over other embodiments of implosion shield 34 in that the number of layers of ballistic fabric can be selected and adjusted by adjusting the number of wraps of ballistic material, between the most internal edge 74a of the wrap and the most external edge 74b of the wrap, so as to provide optimized blast, debris and fragmentation, sound wave, pressure wave and shock wave protection to the area outside or beyond the implosion shield 72 during a detonation of implosion sleeve 26.

Figure 7:
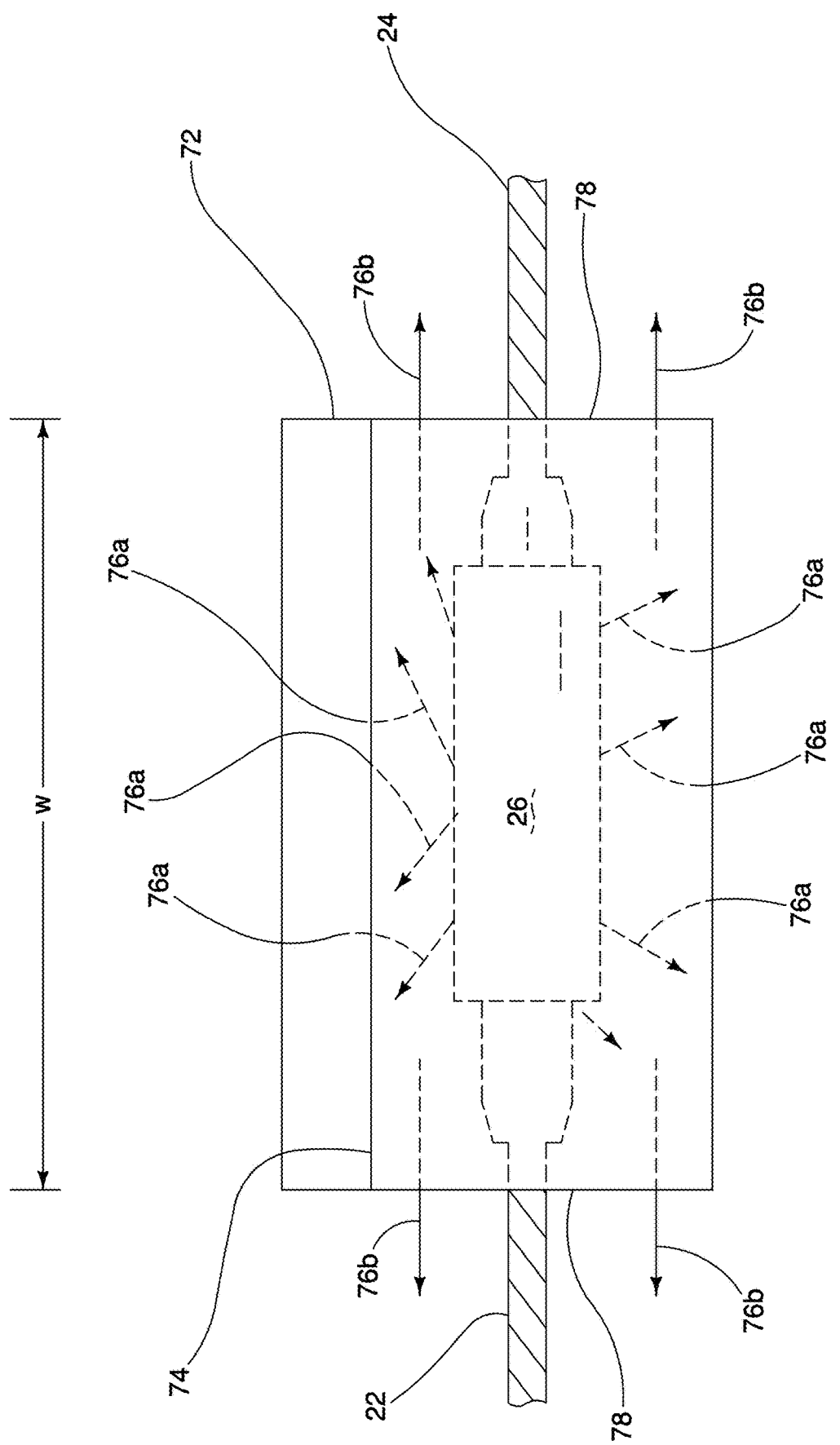
FIG. 7 is a top view of FIG. 6 of an implosion shield rolled or wrapped around an implosion sleeve in accordance with the present disclosure.

FIG. 7 is a side view of the wrapped implosion shield 72 of FIG. 6 depicting implosion sleeve 26, shown in dotted outline, with a single piece of ballistic fabric, which may be rectangular, wrapped around implosion sleeve 26. Explosion debris, accelerated pressurized gases from the explosion, shock and pressure waves, and sound waves produced as a result of detonating the detonation cord on implosion sleeve 26, are managed by wrapped implosion shield 72 so as to reduce the severity of their external impact. Heated gas flow paths are depicted diagrammatically in FIG. 7 so as to show generally the re-direction of the gas flow paths from their initial radially outward paths 76a relative to the detonation of the implosion sleeve 26, so as to be redirected to escape paths 76b exiting the opposite ends 78 of the wrapped implosion shield 72, generally parallel with the conductors 22, 24. Thus, debris falling to the ground may be lessened, sound may be attenuated, and shock and pressure waves reduced when employing wrapped implosion shield 72.

Figure 8:
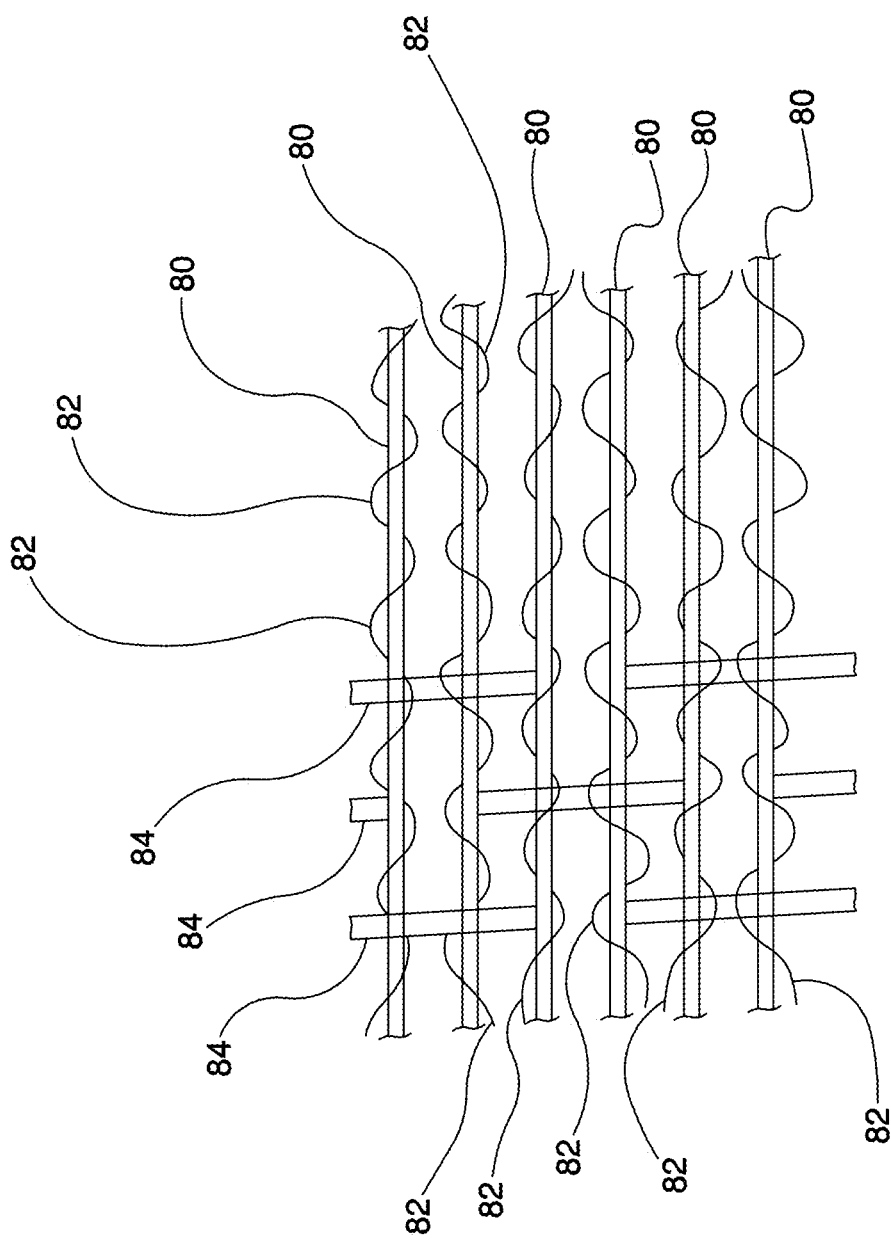
FIG. 8 is a top view of material of an implosion shield in accordance with the present disclosure.

FIG. 8 depicts how the material of implosion cover 34 could be woven or configured if an implosion shield ballistic material for implosion shield 34 is not sourced commercially. Core fibres 80 and wrap fibres 82 may be configured as depicted in FIG. 8. That is, a single wrap fibre 82 may simply wrap or wind helically around a single core fibre 80. Parallel core fibres 80 may be joined or woven together with connecting fibres 84, which weave as depicted, alternating in crossing above two core fibres 80, and then crossing under the next adjacent two core fibres 80, and so on to continue in that fashion for the entire width of implosion shield 34. The material used as an implosion shield may advantageously meet the U.S. military specification standard MIL-STD-2105.

Where the wrapped implosion shield 72 uses auxetic ballistic material, the structure of which may be as described above in respect of FIG. 8, in applicant's view it may be advantageous to align the longitudinal axes of core fibres 80 along the length of wrapped implosion shield 72 so that, as the wrapped implosion shield is wrapped around the implosion sleeve 26, so too the core fibres 80 are similarly wrapped around the implosion sleeve 26. The result postulated by the applicant is that, upon detonation of the implosion sleeve 26, the rapidly expanding hot gases expanding radially in path directions 76a put the core fibres 80 into tension as the coil of the wrap is tightened due to the high pressure within. Because the ballistic fabric is auxetic, tensioning of the core fibres along their length will result in expansion of the width w, seen defined in FIG. 7, of the wrapped ballistic fabric forming wrapped implosion shield 72. The increase in width w will, it is postulated, open up apertures between core fibres 80, thereby allowing the outwardly expanding hot pressurized gases to escape through the wrap while still attenuating the pressure wave and catching debris. The shock wave, because to according to applicant's information that it radiates more quickly and ahead of the pressure and sound waves, would be most effectively attenuated before the auxetic fabric could react and fully expand its width. Advantageously, the auxetic ballistic material is resilient so that, upon the gas pressure subsiding, the width w will return to its original dimension, thereby closing the apertures, and ready for re-use.

A method of utilizing an implosion cover 34 on a power line 10 may include installing an implosion sleeve 26 on an electrical conductor 22 and an electrical conductor 24 (i.e., a power line), such as by using a bucket truck 11 as depicted in FIG. 2, and then wrapping implosion shield 72 around implosion sleeve 26 as depicted in FIG. 6. The method of wrapping or coiling implosion shield 72 around implosion sleeve 26 may further include forming multiple layers, such as seen by way of example in FIG. 6, by continued wrapping of the ballistic fabric of implosion shield 72 around implosion sleeve 26 until the desired wrap density is achieved to optimize the attenuation of the effects of the anticipated blast intensity. The method may include using multiple, completely separate pieces of ballistic fabric that each are, and act as, an implosion shield. Such separate pieces may be square or rectangular sections that form an implosion shield when joined or fastened together, such as implosion shield 34 explained in connection with FIGS. 3, 4 and 5. The method may include securing the implosion shield 72 using fasteners such as described for fasteners 40, including stitching using plastic, nylon, or other natural or synthetic including aramid materials, such as sold commercially under the trademarks KEVLAR and Spectra. The method of utilizing an implosion shield according to aspects of the present disclosure may further include detonating the implosion sleeve, and attenuating shock, pressure and sound waves with the implosion shield.

Figure 9:
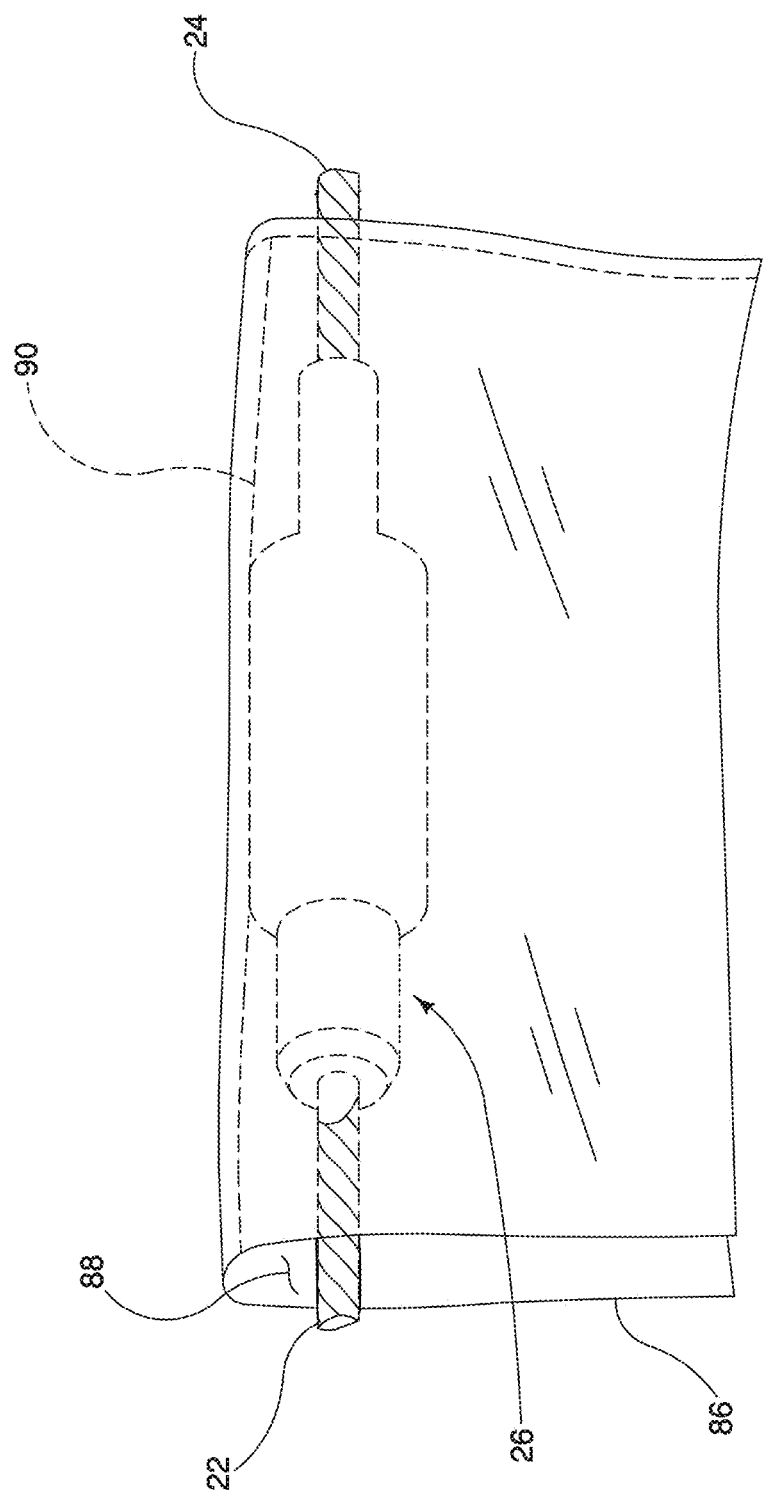
FIG. 9 is a perspective view of an implosion sleeve with an implosion shield draped over the implosion sleeve.

FIG. 9 depicts a perspective view of an implosion sleeve 26 with an implosion cover 86 draped over and draped around implosion sleeve 26. In the embodiment depicted in FIG. 9, implosion cover 86 is not supported by any type of frame, nor is formed as an envelope or wrapped, but is merely draped over or placed around implosion sleeve 26 such that an inside surface 88 of implosion cover 86 contacts a portion of implosion sleeve 26. More specifically, as an example, when implosion cover 86 is placed around implosion sleeve 26, a top inside fold edge 90 may contact an upper outside surface of implosion sleeve 26. With this arrangement, shock, pressure and sound waves, and any debris from detonating implosion sleeve 26 may be attenuated, lessened, or contained respectively due to the draped placement of implosion cover 86. If the lowermost edges of cover 86 hang sufficiently far below implosion sleeve 26, in one embodiment weights (not shown) may be attached to or otherwise affixed to the lowermost edges to assist in holding the cover 86 in place before and during the detonation, or fasteners (not shown) as described above may be used along bottom edges of cover 86 to join it together and keep it in place.

Figure 10:
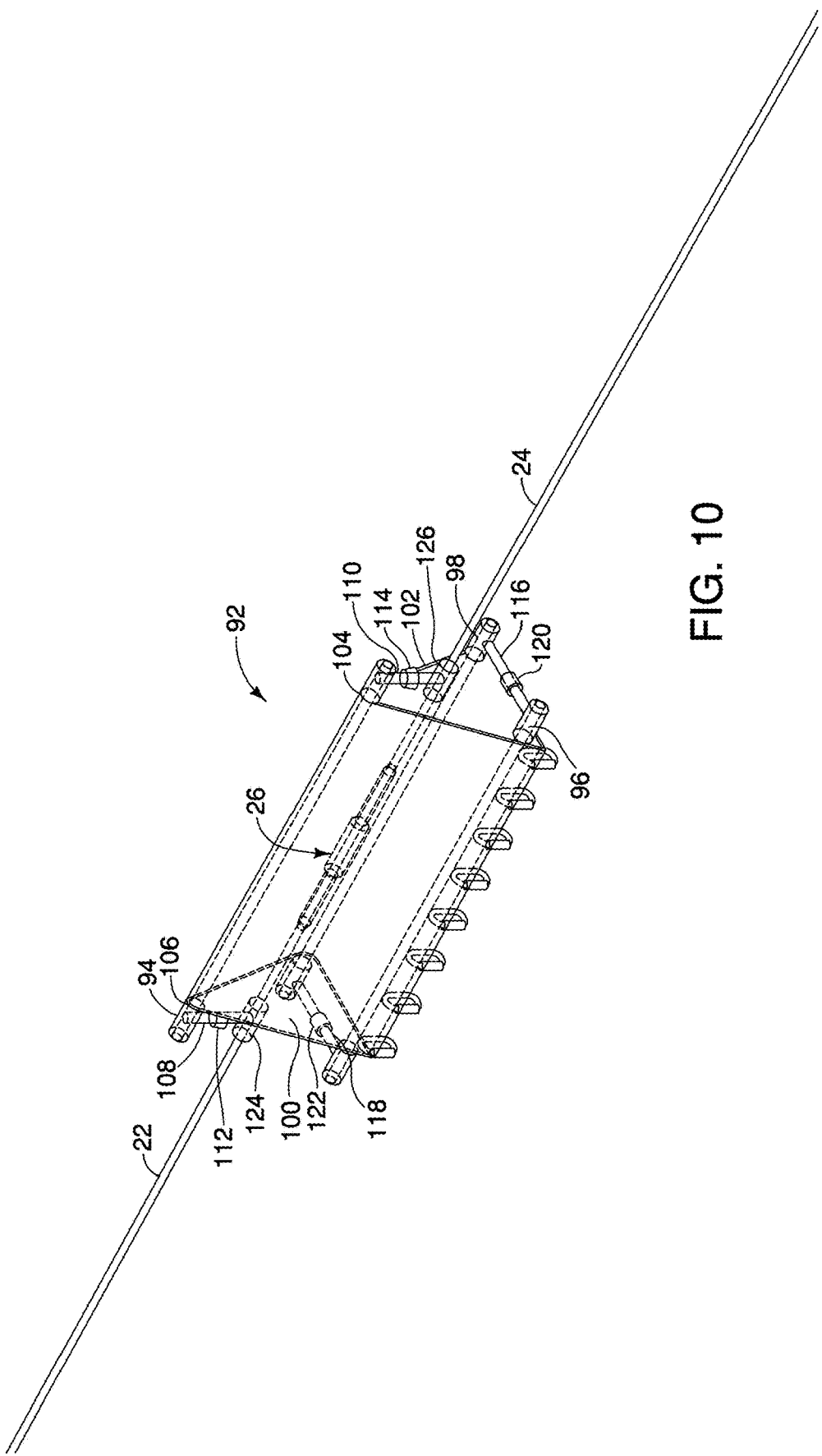
FIG. 10 is a perspective view of an implosion sleeve with an implosion shield surrounding an exterior of the implosion sleeve.

FIG. 10 depicts a perspective view of an implosion sleeve 26 with an implosion shield 92 surrounding an exterior of the implosion sleeve 26. In the embodiment depicted in FIG. 10, implosion shield 92 may be supported by a frame, which may employ a top bar 94, and a first lower bar 96, and a second lower bar 98. In the embodiment depicted in FIG. 10, implosion cover panel 100 and implosion cover panel 102, may be two separate pieces of auxetic ballistic blast material, the same or similar to that explained in this disclosure, or the implosion cover instead may be a single piece of an auxetic ballistic blast material. Top bar 94 may support implosion cover panel 100 and implosion cover panel 102 if it is two pieces, or if it is one unitary piece. In either configuration, a first top clamp 104 and a second top clamp 106 may affix implosion cover panel 100 and implosion cover panel 102 to hold them in place at and to top bar 94. First lower bar 96 and second lower bar 98 may respectively secure implosion cover panel 100 and implosion cover panel 102 at their ends opposite to top bar 94. Top bar 94 may be supported using a first top bar support 108 and a second top bar support 110, which each may span the distance between top bar 94 and conductor 22 and conductor 24, respectively. First adjustment device 112 may be used to extend and retract first top bar support, and second adjustment device 114 may be used to extend and retract second top bar support 110. As examples, first top bar support 108 may secure to conductor 22 with clamp 124, and second top bar support 110 may secure to conductor 24 with clamp 126. First lower bar 96 and second lower bar 98 may be spaced apart and held in place using a first lower spacer bar 116 and a second lower spacer bar 118. First lower spacer bar 116 and second lower spacer bar 118 each may be adjusted to increase or decrease the space between first lower bar 96 and second lower bar 98 using adjustment device 120 and adjustment device 122, respectively, which may permit first lower spacer bar 116 and second lower spacer bar 118 to telescope, or otherwise account for spacing changes. With this arrangement, shock and pressure waves, noise waves, and any debris from detonating implosion sleeve 26 may be attenuated, lessened, or contained due to placement of implosion cover panels 100 and 102, if two covers are utilized, or alternatively if one continuous cover panel is utilized.

Figure 11:
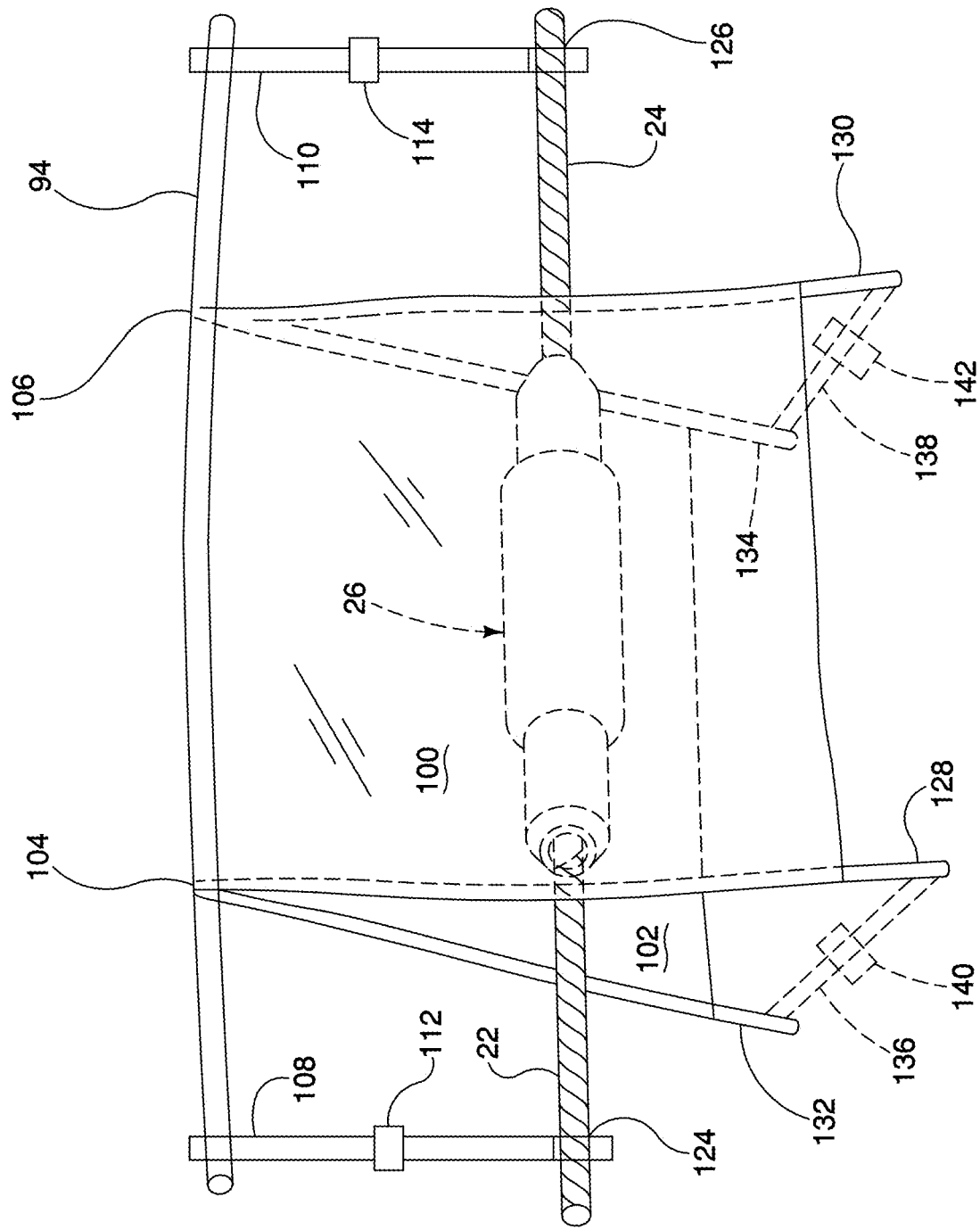
FIG. 11 is a perspective view of an implosion sleeve with an implosion shield surrounding an exterior of the implosion sleeve.

FIG. 11 depicts another embodiment in a perspective view of an implosion sleeve 26 with an implosion cover panel 100 and implosion cover panel 102 surrounding an exterior of implosion sleeve 26 configured for supporting the frame on the ground. Thus in the embodiment of FIG. 11, an alternative frame arrangement is depicted when compared to FIG. 10. More specifically, top bar 94 and its connection and spacing from conductor 22 and conductor 24, are secured using first top bar support 108 and second top bar support 110, with each being adjustable using first adjustment device 112 and second adjustment device 114, respectively. As examples, first top bar support 108 may secure to conductor 22 with clamp 124, and second top bar support 110 may secure to conductor 24 with clamp 126. First top clamp 104 and second top clamp 106 may be used to secure implosion cover panel 100 and implosion cover panel 102 to top bar 94. Implosion cover panel 100 may be supported by a frame, which may be a first bar 128 and a second bar 130, while implosion cover panel 102 may be supported by a frame, which may be a third bar 132 and a fourth bar 134. With such a structure, like the embodiment of FIG. 10, an A-frame structure may be configured around implosion sleeve 26. To better stabilize the implosion cover panel 100 and implosion cover panel 102, a first cross bar 136 and a second cross bar 138 may be employed. A first cross bar adjustment device 140 and a second cross bar adjustment device 142 may be used to adjust the spacing between the ends of first bar 128 and third bar 132, and the ends of second bar 130 and fourth bar 134, respectively.

Figure 12:
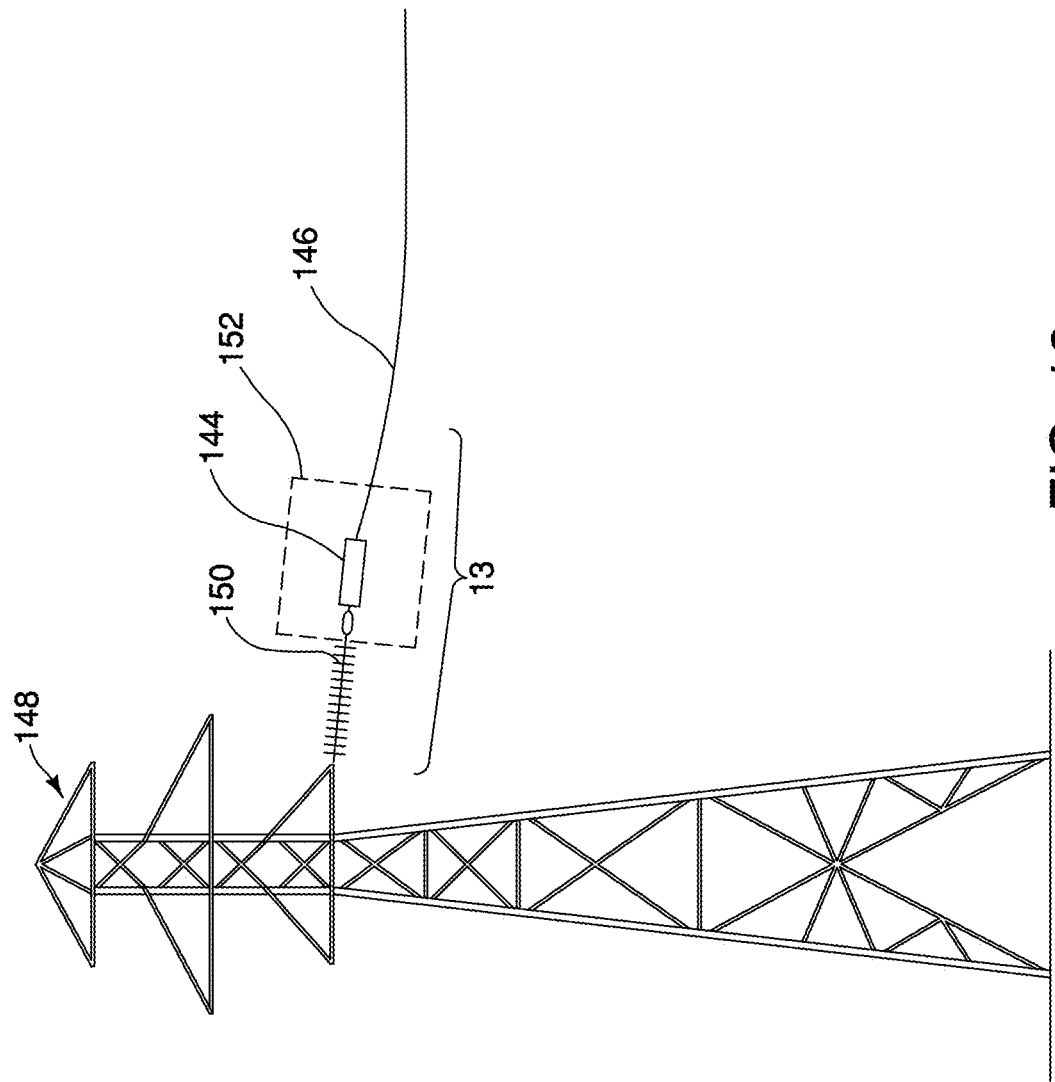
FIG. 12 is a perspective view of an implosion dead-end sleeve terminating an electrical conductor to a dead-end structure.
Figure 12A:
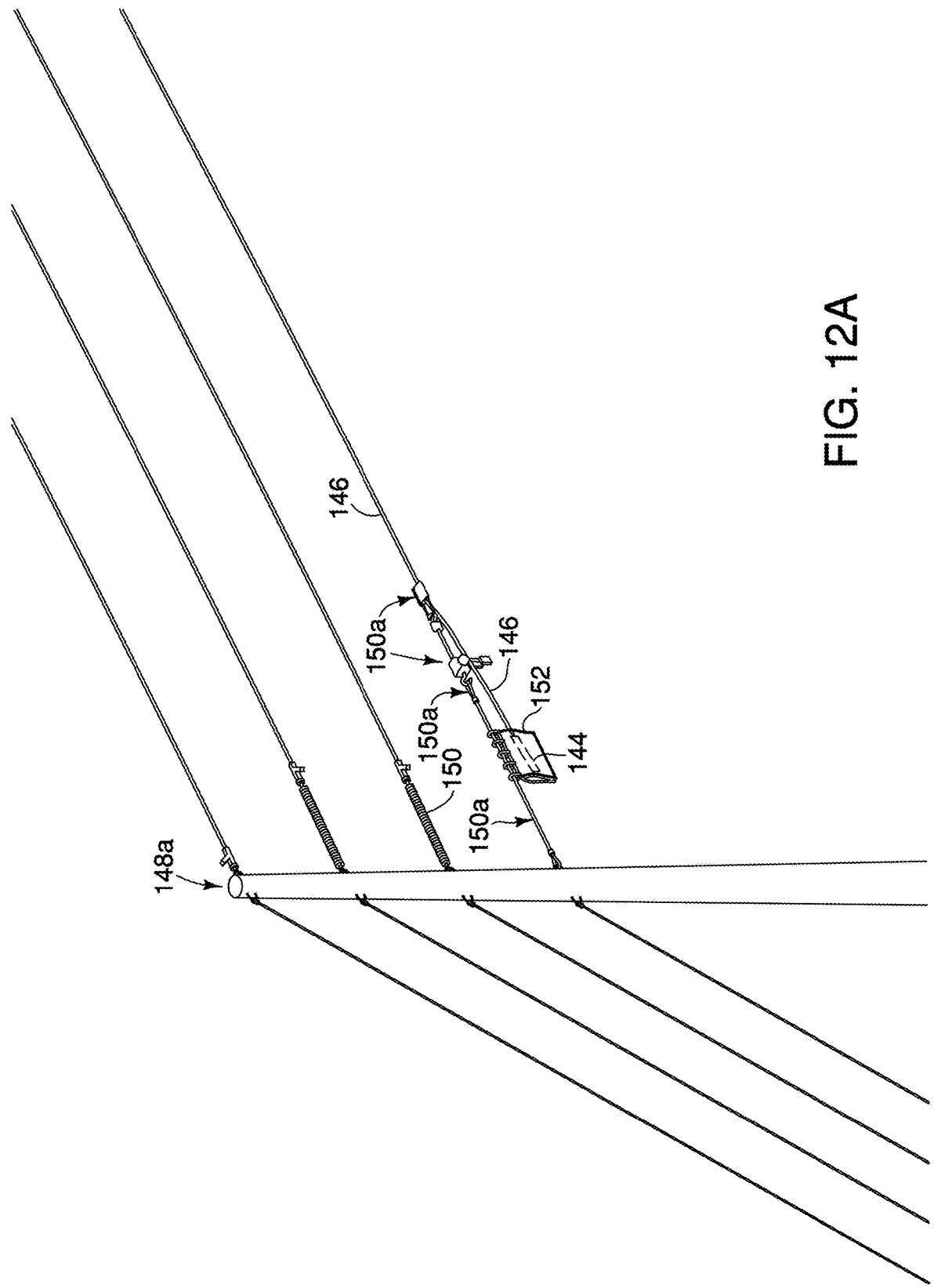
FIG. 12A is a perspective view of an implosion dead-end sleeve terminating an end of a conductor at a dead-end on a dead-end support structure.
Figure 14:
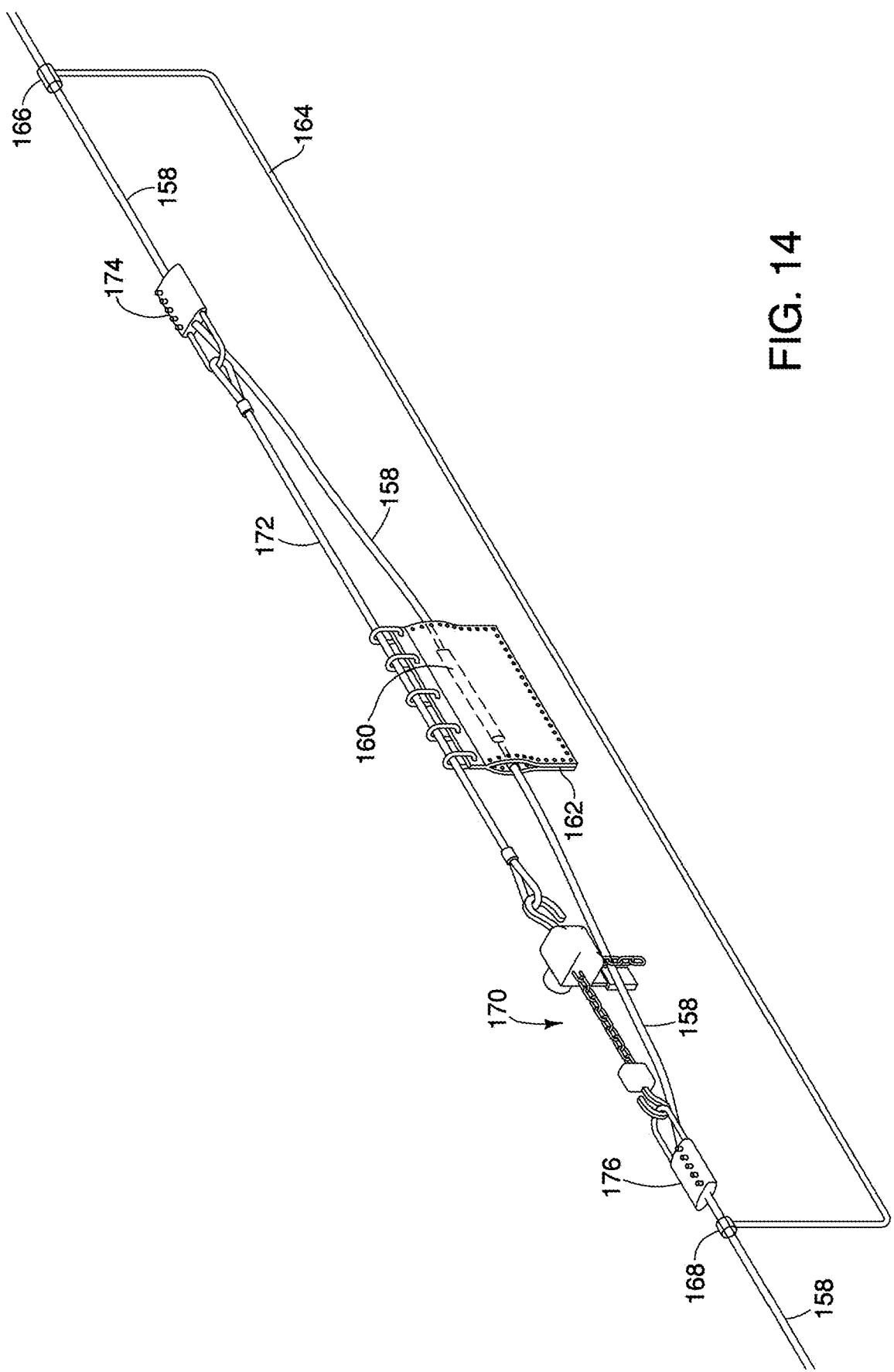
FIG. 14 is a perspective view of an implosion sleeve mounted between two conductor ends of a live conductor and encased in an implosion shield, wherein the live conductor is shown bypassed around the site of the implosion splice.

FIG. 12 is a perspective view of an implosion dead-end sleeve 144 terminating and connecting an electrical conductor 146 to a dead-end structure 148 using electrical insulator or insulators 150. More specifically, electrical conductor 146 is mechanically connected to implosion dead-end sleeve 144 using implosion techniques. Implosion dead-end sleeve 144 is mechanically connected to an electrical insulator or insulators 150, which is mechanically connected to dead-end structure 148, such as to a cross arm or other structural part of dead-end structure 148. Implosion dead-end sleeve 144 is used to terminate electrical conductor 146 and maintain tension in and of electrical conductor 146. Implosion cover 152 is depicted in dotted outline and may be used to completely cover and surround an exterior of implosion dead-end sleeve 144. By completely covering and surrounding an exterior of implosion dead-end sleeve 144, when it is imploded to secure a mechanical connection between electrical conductor 146 and electrical insulator or insulators 150, with implosion cover 152, any surrounding structures, hardware, insulators, rigging, tooling and equipment may be protected. For example, implosion cover 152 may be used as a barrier to protect insulator or insulators 150, which in FIG. 12, is a dead-end insulator or insulators because insulator or insulators 150 is installed on dead-end structure 148. Because implosion cover 152 is a physical barrier, it protects adjacent structures, rigging and tooling, such as dead-end insulators, grips, hoists and slings used to support the electrical conductor 146 or tension in electrical conductor 146. Implosion cover 152 may also protect bypass jumpers (also known as bypass circuits) and permanent jumpers installed and used to carry line current and voltage, be it a dead-end sleeve or a midspan sleeve. Thus, any time an implosion sleeve or dead-end sleeve is installed, the conductor tension has to be supported (i.e., maintained), such as by using grips, hoists and slings such as seen in FIG. 12A and collectively labelled 150a, wherein dead-end sleeve 144 is used to terminate the end of conductor 146 and the dead-end is supported on dead-end support structure 148a. If an implosion sleeve or dead-end sleeve is installed during an energized project, in which the electricity continues to pass through the electrical conductor, a conductive jumper such as seen in FIG. 14 has to be run alongside to carry the load. This equipment is installed in parallel (electrically parallel, and physically parallel) to the conductor, and either the implosion sleeve or dead-end sleeve, as the case may be.

Figure 13:
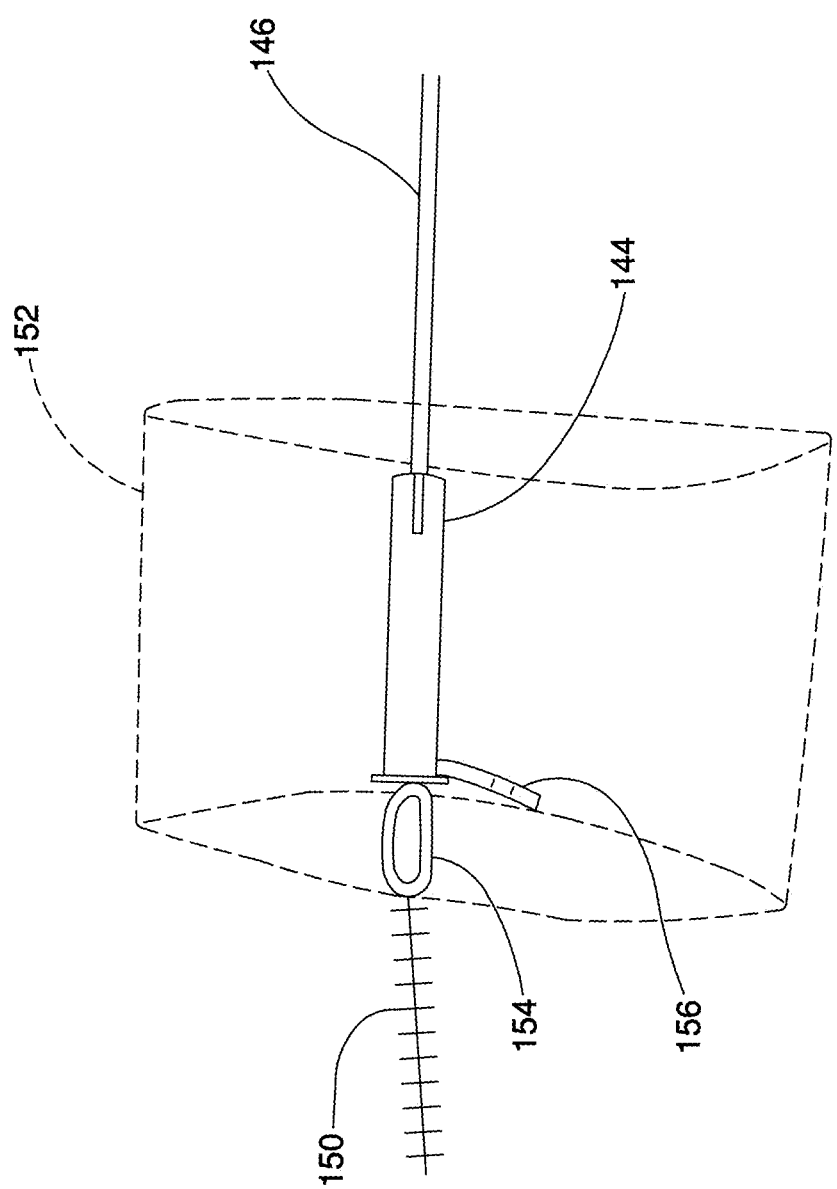
FIG. 13 is an enlarged view of the implosion dead-end sleeve terminating an electrical conductor to a dead-end structure depicted in FIG. 12.

FIG. 13 is an enlarged view of a portion of FIG. 12 showing the implosion dead-end sleeve 144 terminating an electrical conductor 146 and electrical insulator or insulators 150, which is mechanically connected to dead-end support structure 148. More specifically, implosion dead-end sleeve 144 may be equipped with an eye 154 to facilitate a mechanical connection between implosion dead-end sleeve 144 and electrical insulator or insulators 150. Implosion dead-end sleeve 144 may also be equipped with a connector pad 156, which may facilitate electrical connection to an electrical jumper to transfer electricity to another electrical conductor (not shown). FIG. 13 depicts how implosion cover 152 may be folded over implosion dead-end sleeve 144 to prevent debris from implosion of implosion dead-end sleeve 144 from escaping outside of implosion cover 152 and striking anything. Implosion cover 152 may also attenuate noise or sound during imploding of implosion dead-end sleeve 144. In addition to being folded over and/or around implosion dead-end sleeve 144, because implosion cover 152 is flexible and pliable it may be wrapped completely around implosion dead-end sleeve 144 in the same or similar manner as depicted in FIG. 6.

FIG. 14 depicts an energized electrical conductor 158 into which an implosion sleeve 160 has been installed to do an implosion splice between two conductor ends placed into the opposite ends of sleeve 160. An implosion cover 162 is mounted around implosion sleeve 160, in this case suspended from tension sling or cable 172 by carabiners or the like. Implosion cover 162 may be folded over implosion sleeve 160, or wrapped around implosion sleeve 160, but in this case is hung downwardly so that the conductor ends and the implosion sleeve 160 are positioned in the envelope of the implosion cover.

Also used during an energized installation of implosion sleeve 160 is a bypass circuit or jumper 164, shown in FIG. 14, also known as a bypass jumper, that is connected to energized electrical conductor 158 using connector 166 and connector 168. To establish slack in energized electrical conductor 158 to permit a non-tension installation of implosion sleeve 160 in energized electrical conductor 158, a hoist 170 is used to impart tension in a temporary tension sling or cable 172 that is connected to energized electrical conductor 158 using conductor grip 174 and conductor grip 176. Temporary tension sling or cable 172 maintains tension in energized electrical conductor 158 during installation of implosion sleeve 160. Similar to depictions in FIGS. 10 and 11, implosion cover 152 may be held in place or otherwise supported with a frame that surrounds implosion sleeve 160 to prevent debris from striking conductor grips/clamps 174, 176, hoist 170 and any slings 172, which are used during installation of implosion sleeve 160, or similarly, installation of a dead-end implosion sleeve 144 as depicted in FIGS. 12 and 13.

The teachings of the present disclosure may be employed on non-energized power lines or energized power lines. Energized power lines have electricity flowing through them. Thus, efficiencies may be increased while joining conductor 22 and conductor 24 when compared to splicing in a non-energized state insofar as at least the process of de-energizing conductor 22 and, or conductor 24 may not have to be undertaken to splice or join together conductor 22 and conductor 24. If an implosion cover is utilized in an electrically energized environment that employs an electrically conductive frame, such as a metal frame, such as in the case of the structures depicted and explained in connection with FIGS. 10 and 11, then during an implosion of implosion sleeve 26, metal frame parts will be at the same voltage as conductor 22 and conductor 24, and may be bonded-on to the live conductors to achieve such.

Figure 15:
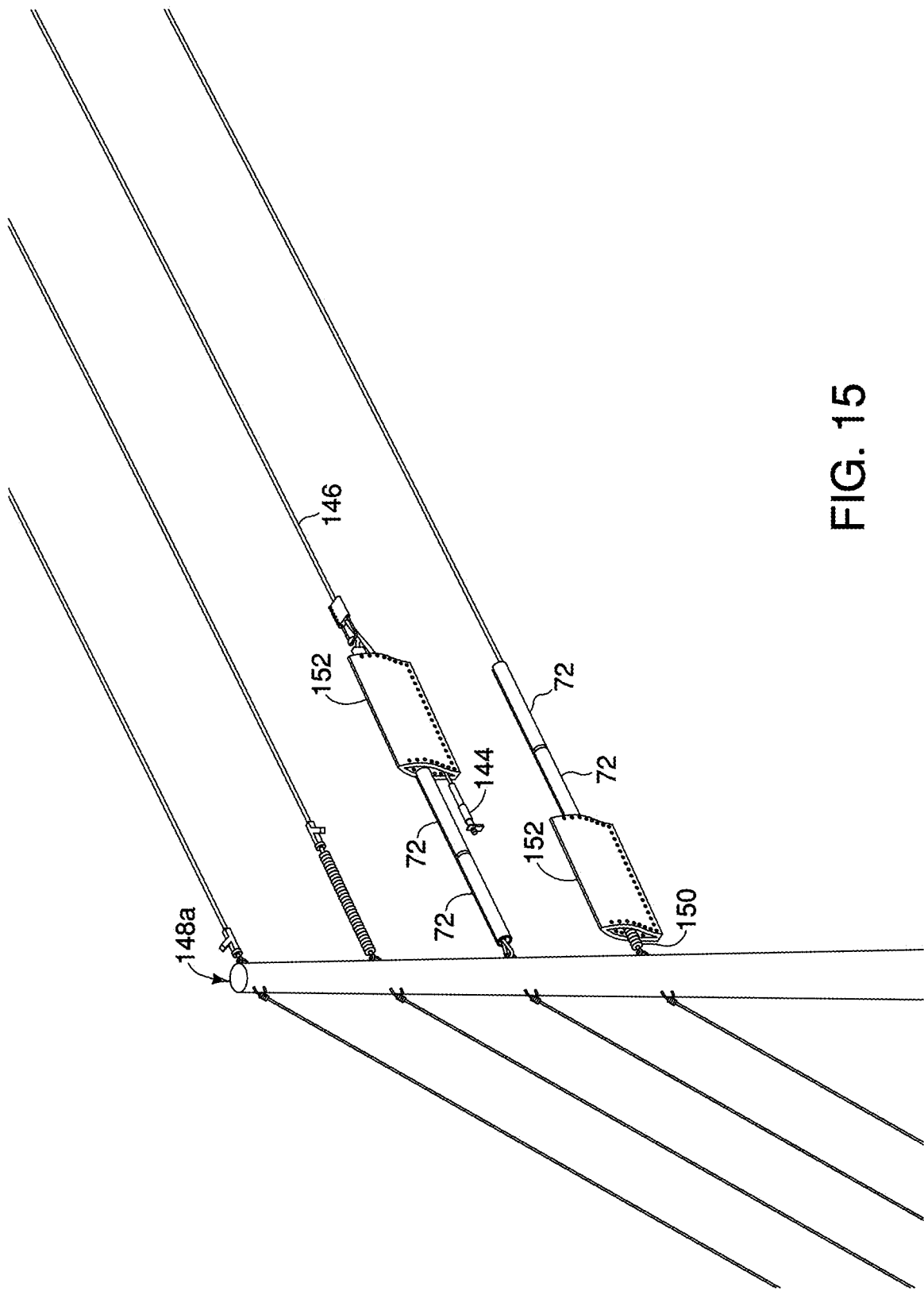
FIG. 15 is a perspective view of a dead-end implosion sleeve at a dead-end structure showing the use of wrapped implosion shields and envelope implosion shields to protect insulators, rigging, hardware, etc. from the detonation of the exposed dead-end implosion sleeve.

FIG. 15 is a perspective view of an exposed dead-end implosion sleeve 144 at a dead-end showing the use of wrapped implosion shields 72 and envelope implosion shields 152 to protect insulator or insulators 150, rigging, hardware, etc., better seen in FIG. 15A, from the detonation of the exposed dead-end implosion sleeve 144.

Figure 16:
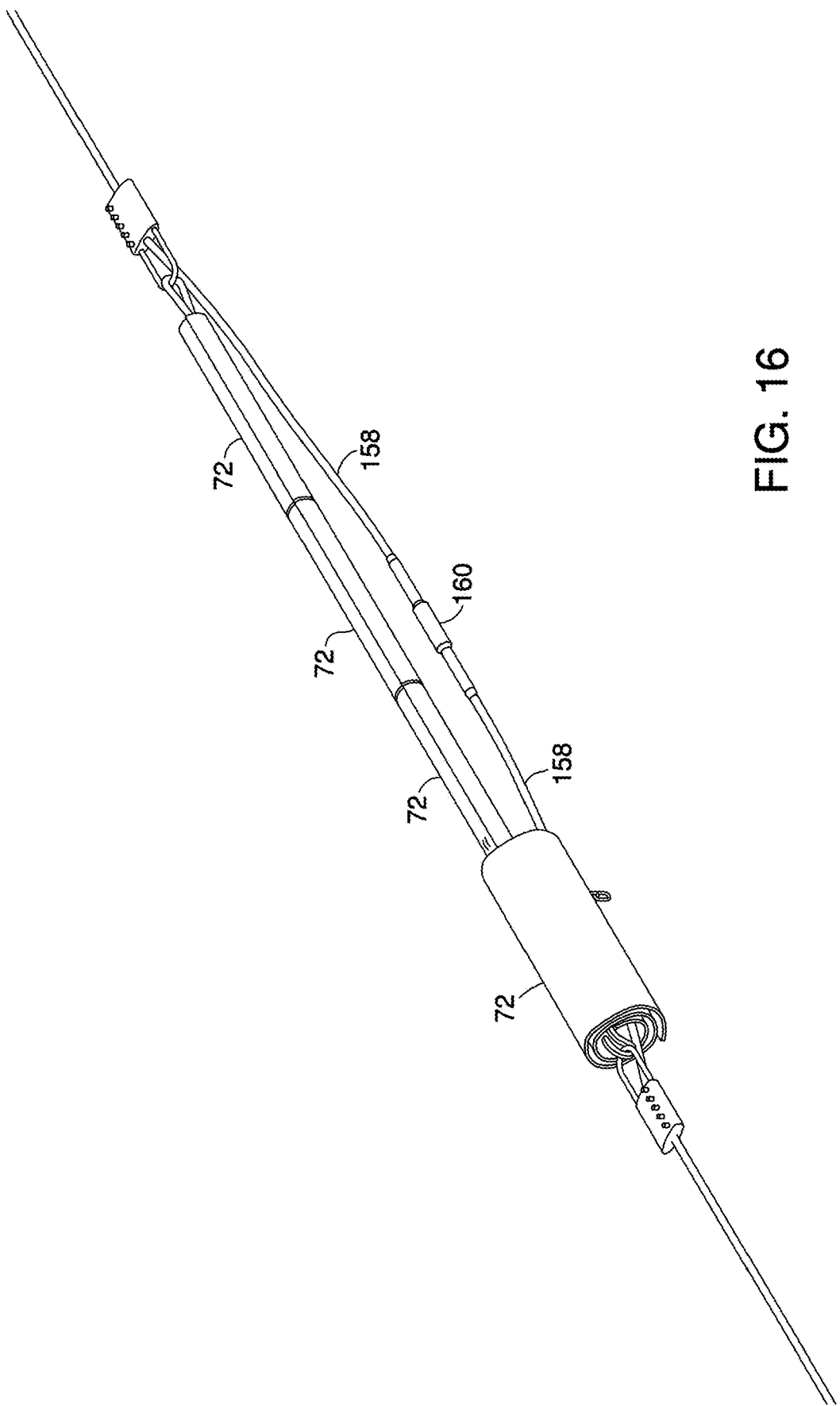
FIG. 16 is a perspective view of the implosion splice arrangement of FIG. 14 showing the use of wrapped implosion shields to protect the rigging from the exposed implosion sleeve being used to create the implosion splice.
Figure 16A:
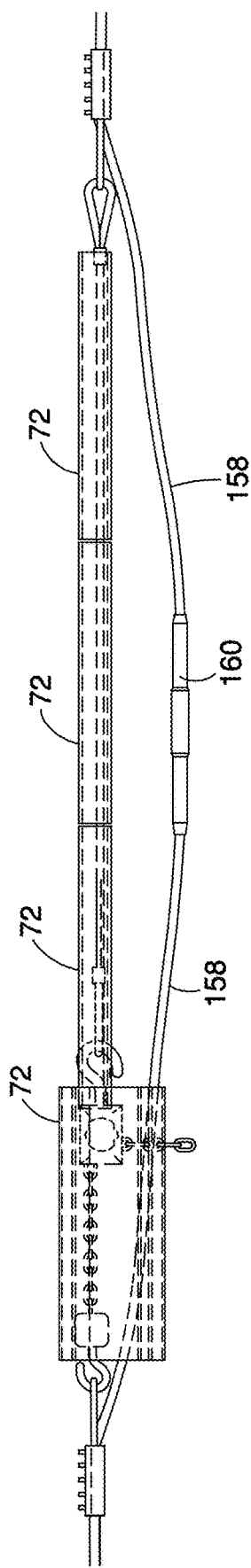
FIG. 16A is a side elevation view of FIG. 16 showing the protected rigging in better detail.

FIG. 16 is a perspective view of the implosion splice arrangement of FIG. 14 showing the use of wrapped implosion shields 72 to protect the rigging, better seen in FIG. 16A, from the exposed implosion sleeve 144 being used to create the implosion splice. Wrapped implosion shields 72 may, as illustrated, be used to wrap around both larger and smaller objects to be protected.

In closing, it should be noted that the discussion of any reference is not an admission that it is prior art to the present disclosure, especially any reference that may have a publication date after the priority date of this application. At the same time, each and every claim below is hereby incorporated into this detailed description or specification as an additional embodiments of the present disclosure.

Although the systems and processes described herein have been described in detail, it should be understood that various changes, substitutions, and alterations can be made without departing from the spirit and scope of the disclosure as defined by the following claims. Those skilled in the art may be able to study the preferred embodiments and identify other ways to practice the disclosure that are not exactly as described herein. It is the intent of the inventors that variations and equivalents of the disclosure are within the scope of the claims while the description, abstract and drawings are not to be used to limit the scope of the disclosure. The disclosure is specifically intended to be as broad as the claims below and their equivalents.

The invention claimed is:

1. A pliable implosion shield for attenuating effects of a blast intensity around an implosion sleeve or dead-end sleeve installed on a power line, wherein the implosion sleeve or dead-end sleeve has at least horizontally exposed sides, the implosion shield comprising:
   a first panel and a second panel; wherein the first and second panels are made of a flexible ballistic fabric and are adapted to be located on opposite sides of the at least horizontally exposed sides of the installed implosion sleeve or dead-end sleeve;
   the first and second panels forming an envelope, when installed, around the installed implosion sleeve or dead-end sleeve; and
   wherein, in operation, the implosion sleeve or dead-end sleeve and the at least horizontally exposed sides are located within a hollow of the envelope and the at least horizontally exposed sides are spaced from at least one edge of the envelope so as to contain the effects of the blast intensity within the envelope.

2. The shield of claim 1, wherein the first panel and second panel are continuous and are formed from a single, rectangular piece of flexible ballistic fabric that is folded once around one horizontally exposed side of the implosion sleeve or dead-end sleeve so as to define a fold at a first long edge of the fabric and loose ends at a second and opposite long edge of the fabric, and wherein, the loose ends at the second and opposite long edge are coupled to one another by a plurality of fasteners, spaced along the second and opposite long edge, and wherein, the first and second long edges are spaced from the at least horizontally exposed sides of the implosion sleeve or dead-end sleeve.

3. The shield of claim 1, wherein the first panel and second panel are continuous and are formed from a single, rectangular piece of flexible ballistic fabric that is folded once over one horizontally exposed side of the implosion sleeve or dead-end sleeve so as to define a fold at a first long edge of the fabric and loose ends at a second and opposite long edge of the fabric, and wherein, the loose ends at the second and opposite long edge are coupled to one another by a plurality of fasteners, and wherein, the fold is located on the one horizontally exposed side of the implosion sleeve or dead-end sleeve and the second and opposite long edge is spaced from the one horizontally exposed side of implosion sleeve or dead-end sleeve.

4. The shield of claim 1, wherein the first and second panels are formed of two, separate and distinct rectangular pieces of flexible ballistic fabric, and wherein the first and second panels are coupled to one another along their first and second long edges by a plurality of fasteners, spaced along the first and second long edges, and wherein the first and second long edges are spaced from the at least horizontally exposed sides of the implosion sleeve or dead-end sleeve.

5. The shield of claim 1, wherein the first and second panels are formed of two, separate and distinct rectangular pieces of flexible ballistic fabric, and wherein the first and second panels are coupled to one another along their short and long edges by a plurality of fasteners, spaced along the short and long edges, and wherein the long edges are spaced from the at least horizontally exposed sides of the implosion sleeve or dead-end sleeve.

6. The shield of claim 1, wherein the first and second panels are formed of two, separate and distinct rectangular pieces of flexible ballistic fabric, and wherein the first and second panels are supported on opposite sides of an A-frame located around the at least horizontally exposed sides of the implosion sleeve or dead-end sleeve, and wherein the first and second panels are operatively coupled to each other at a top edge of the A-frame through a plurality of clamps, and wherein at least the top edge is spaced from one horizontally exposed side of the implosion sleeve or dead-end sleeve.

7. The shield of claim 6, wherein the A-frame is supported on the power line.

8. The shield of claim 6, wherein the A-frame is supported on a ground under the power line.

9. The shield of claim 1, wherein the first panel and second panel are continuous and are formed from a single, rectangular piece of flexible ballistic fabric that is folded once over a top edge of an A-frame located around the at least horizontally exposed sides of the implosion sleeve or the dead-end sleeve, and wherein the first and second panels are operatively coupled to each other at the top edge of the A-frame through a plurality of clamps, and wherein at least the top edge is spaced from one horizontally exposed side of the implosion sleeve or dead-end sleeve.

10. A system for attenuating effects of a blast intensity around a power line comprising:
    an implosion sleeve or dead-end sleeve, having at least horizontally exposed sides, adapted to be installed on the power line; and
    an implosion shield made of a flexible ballistic fabric and adapted to be mounted over the implosion sleeve or dead-end sleeve, when the implosion sleeve or dead-end sleeve is installed on the power line, so as to surround the at least horizontally exposed sides of the implosion sleeve or dead-end sleeve during detonation of the implosion sleeve or dead-end sleeve.

11. The system of claim 10, wherein the implosion shield is adapted to be wrapped around the implosion sleeve or dead-end sleeve.

12. The system of claim 11, wherein the implosion shield is a wrapped implosion shield adapted to be coiled around the implosion sleeve or dead-end sleeve so as to form more than one layer of the wrapped implosion shield wrapped around the implosion sleeve or dead-end sleeve.

13. The system of claim 11, wherein the implosion shield is an envelope formed of the ballistic fabric.

14. The system of claim 13, wherein the envelope has circumferentially extending edges, and wherein the edges are joined together with fasteners extending at least partially along the edges.

15. The system of claim 14, wherein the edges are joined together so as to define a gas escape through-way in the envelope for pressurized gas from the detonation to exit the envelope.

16. The system of claim 13, wherein the envelope is formed of auxetic ballistic fabric.

17. The system of claim 11, wherein the implosion shield is formed as a tent.

18. The system of claim 10, wherein the ballistic fabric is auxetic ballistic fabric.

19. The system of claim 18, wherein the auxetic ballistic fabric is made of core fibres wrapped in wrap fibres, and wherein longitudinal lengths of the core fibres are arranged so that detonation of the implosion sleeve or dead-end sleeve, when the implosion shield is mounted over the implosion sleeve or dead-end sleeve, tensions the core fibres along their longitudinal lengths so as to cause auxetic expansion of the auxetic ballistic fabric to thereby temporarily open gas venting apertures in the auxetic ballistic fabric to at least partially vent explosion gases from the detonation.

* * * * *